US008238726B2

(12) United States Patent
Takatsuji et al.

(10) Patent No.: US 8,238,726 B2
(45) Date of Patent: Aug. 7, 2012

(54) AUDIO-VIDEO DATA SYNCHRONIZATION METHOD, VIDEO OUTPUT DEVICE, AUDIO OUTPUT DEVICE, AND AUDIO-VIDEO OUTPUT SYSTEM

(75) Inventors: Ayako Takatsuji, Osaka (JP); Junji Yoshida, Osaka (JP); Masazumi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 239 days.

(21) Appl. No.: 12/866,075

(22) PCT Filed: Feb. 5, 2009

(86) PCT No.: PCT/JP2009/000439
§ 371 (c)(1),
(2), (4) Date: Aug. 4, 2010

(87) PCT Pub. No.: WO2009/098878
PCT Pub. Date: Aug. 13, 2009

(65) Prior Publication Data
US 2010/0315553 A1    Dec. 16, 2010

(30) Foreign Application Priority Data

Feb. 6, 2008  (JP) .................................. 2008-026162

(51) Int. Cl.
*H04N 5/92* (2006.01)
(52) U.S. Cl. ........................................................ 386/338
(58) Field of Classification Search .................. None
See application file for complete search history.

(56) References Cited

U.S. PATENT DOCUMENTS

2006/0012710 A1  1/2006  Sasaki

2006/0132607 A1*  6/2006  Kimber et al. ............. 348/207.1
(Continued)

FOREIGN PATENT DOCUMENTS

JP     2006-033436     2/2006
(Continued)

OTHER PUBLICATIONS

International Search Report issued Mar. 3, 2009 in International (PCT) Application No. PCT/JP2009/000439.
(Continued)

*Primary Examiner* — Huy T Nguyen
(74) *Attorney, Agent, or Firm* — Wenderoth, Lind & Ponack, LLP.

(57) ABSTRACT

To provide an audio-video data synchronization method whereby an increase in the amount of control message transmission can be suppressed and the video output can be prevented from being interrupted. The audio-video data synchronization method includes: obtaining, by the audio output device, a first latency that is a period of time taken for the video output device to output the video, by receiving the display identification data that includes information indicating the first latency from the video output device when the indication of the connection validity status information changes from Invalid to Valid; adjusting, by the audio output device, timing of outputting the audio according to the first latency; obtaining, by the video output device, a second latency which is a period of time taken to output the video in the outputting; notifying the audio output device of the second latency by sending a control message from the video output device when the connection validity status information indicates Valid, the control message including information that indicates the second latency obtained in the obtaining of a second latency; and adjusting, by the audio output device, timing of outputting the audio according to the second latency.

11 Claims, 17 Drawing Sheets

U.S. PATENT DOCUMENTS

| | | |
|---|---|---|
| 2006/0156376 A1 | 7/2006 | Mukaide et al. |
| 2006/0184261 A1* | 8/2006 | Ng et al. .................. 700/94 |
| 2007/0230913 A1 | 10/2007 | Ichimura |
| 2007/0276524 A1 | 11/2007 | Tokuhara |

FOREIGN PATENT DOCUMENTS

| | | |
|---|---|---|
| JP | 2006-186544 | 7/2006 |
| JP | 2007-089013 | 4/2007 |
| JP | 2007-274409 | 10/2007 |
| JP | 2007-318604 | 12/2007 |

OTHER PUBLICATIONS

Hitachi, Ltd., Matsushita Electric Industrial Co., Ltd., Philips Consumer Electronics, International B. V., Silicon Image, Inc., Sony Corporation, Thomson Inc., and Toshiba Corporation, "High-Definition Multimedia Interface Specification Version 1.3a" Nov. 10, 2006.

* cited by examiner

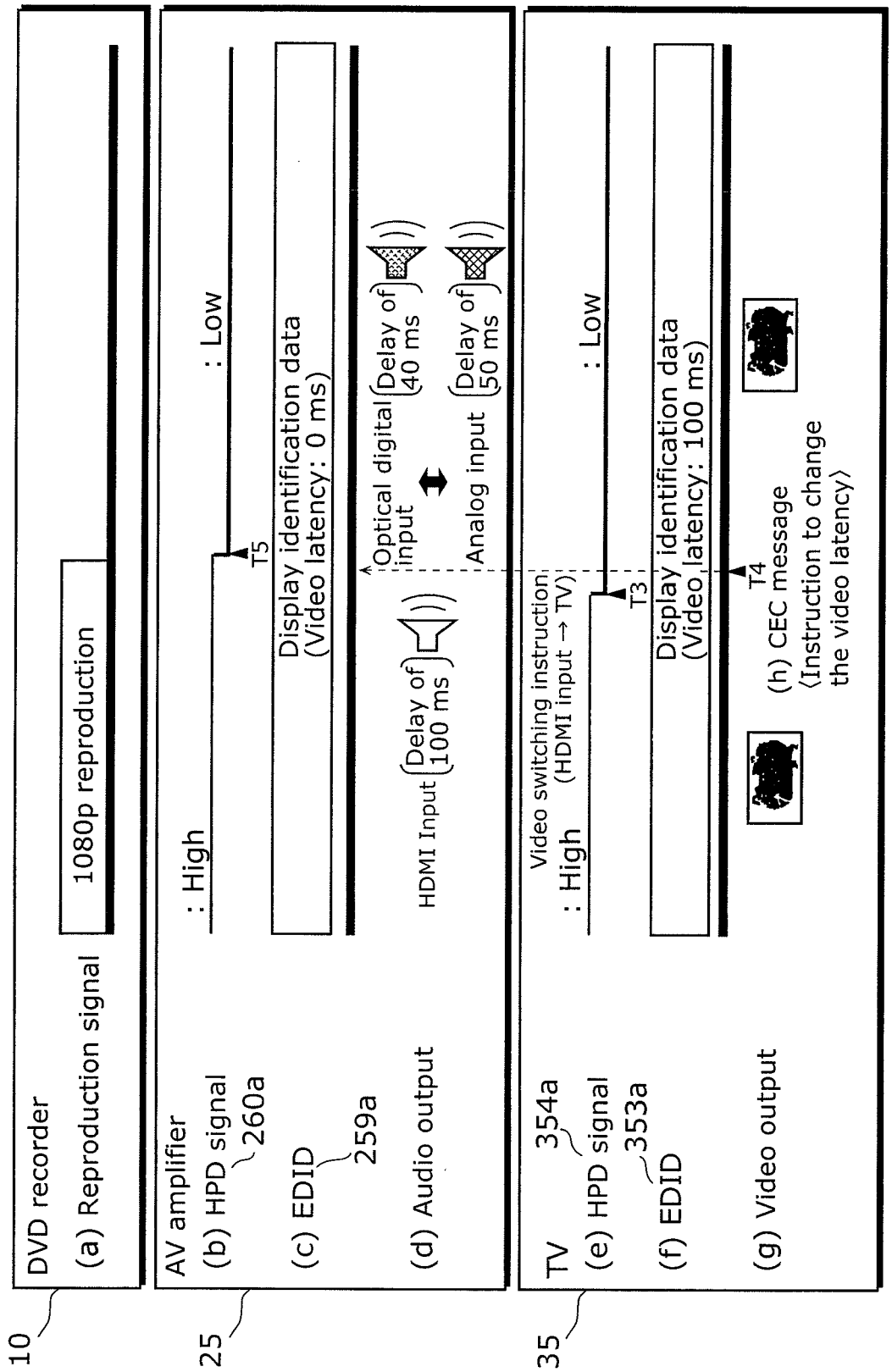

AUDIO-VIDEO DATA SYNCHRONIZATION METHOD, VIDEO OUTPUT DEVICE, AUDIO OUTPUT DEVICE, AND AUDIO-VIDEO OUTPUT SYSTEM

TECHNICAL FIELD

The present invention relates to an audio-video data synchronization method and so forth whereby audio outputted from an audio output device and video outputted from a video output device are synchronized in an audio-video output system that includes the audio output device and the video output device.

BACKGROUND ART

In recent years, a digital device system in which plural home digital devices are interconnected is on its way to allowing a user to view various kinds of contents with high-quality image and sound. For example, using HDMI (High-definition Multimedia Interface) designed in December 2002, the digital device system can output various kinds of contents with high-quality image and sound. The HDMI standard defining specifications of such HDMI is an interface standard that allows video, audio, and control signals to be transmitted via a single cable, and is an input-output interface standard designed for next-generation AV (Audio-Visual) devices that input and output digital video and digital audio.

The HDMI standard defines the CEC (Consumer Electronics Control) protocol as a protocol to transmit a control signal bidirectionally. By using the CEC protocol, the control signal is relayed via plural AV devices. This allows the user to control the plural AV devices with a single remote control. To be more specific, since the control signal is bidirectionally transmitted between, for example, a television set (referred to as the "TV" hereafter), an AV amplifier, and a DVD player-recorder (referred to as the "DVD recorder" hereafter), the user can operate an entire home theater configured by the TV, the AV amplifier, and the DVD recorder with the single remote control.

HDMI has not only a characteristic that no signal deterioration is caused because of the digital transmission, but also a characteristic that a reproduction device such as a DVD recorder can read display identification data of a destination device and thus adjust its own output formats of audio and video data in order for the destination device to reproduce the data. Moreover, as another characteristic, HDMI can encrypt the audio and video data and transmit the encrypted audio and video data, so as to prevent illegal copying.

In HDMI, a DDC (Display Data Channel) bus is used for unidirectionally transmitting the display identification data from a device, such as a TV or an AV amplifier, that has an HDMI input port (referred to as the "HDMI input device" hereafter) to a destination device having an HDMI output port (referred to as the "HDMI output device" hereafter). Here, the "DDC" refers to a standard defined by VESA (Video Electronics Standards Association), as a function of informing the destination device of model information and the like of a display in order to implement a "plug and play" display.

The display model information and information of supported audio and video formats is stored as EDID (Enhanced Extended Display Identification Data) in a memory of the HDMI input device. The EDID is data that is read, via the DDC bus, from the HDMI input device connected to the HDMI output device, basically in response to a change (or a pulse) from Low to High of an HPD (Hot Plug Detect) signal caused by the HDMI input device. More specifically, when the HPD signal is High, this means that the HDMI output device can read the EDID of the HDMI input device. The audio and video formats described in the EDID suggest that the TV and the AV amplifier serving as the HDMI input devices have the capability to reproduce the digital audio and video data in the described formats (note that the HPD signal becomes Low when the destination device is turned off or is not connected).

Here, when the device for outputting video is different from the device for outputting audio, audio and video that are supposed to be in synchronization with each other may be out of synchronization. In other words, a so-called lip-sync error may be caused because the video output lags behind the audio output. To address this problem, the HDMI Standard Version 1.3a (see Non-Patent Reference 1) discloses an audio-video data synchronization method whereby the EDID describes each latency in the audio and video output processing (referred to simply as "the latency" hereafter) so that the output device can automatically adjust the audio output and the video output not to cause a lip-sync error. According to the method described in Non-Patent Reference 1, when the latency changes in the HDMI input device, the HDMI input device updates the information regarding the latency described in the EDID. Then, the HDMI output device reads the changed EDID and automatically adjusts the audio output and the video output. Here, when the HDMI input device updates the EDID, the HPD signal needs to be Low. Moreover, when the HDMI output device reads the EDID, the HPD signal needs to be High. For these reasons, according to the method described in Non-Patent Reference 1, when the latency is updated, a change (or a pulse) from Low to High occurs to the HPD signal.

Moreover, the HDMI standard adopts HDCP (High-bandwidth Digital Content Protection System) as an authentication protocol for verifying whether or not the destination device is valid when content that requires copyright protection is to be outputted. It is defined that authentication processing is started in response to a change (or a pulse) in the HPD signal from Low to High.

That is to say, in the case where the lip-sync error is corrected according to the audio-video data synchronization method described in Non-Patent Reference 1, the HDMI output device performs unnecessary authentication processing whenever the latency is updated. Thus, there is a disadvantage of causing a problem of "blackout" described later.

The aforementioned conventional audio-video synchronization method is explained with reference to the drawings, as follows.

FIG. 1 is a diagram showing an example of a configuration of a conventional HDMI-connected audio-video output system. As shown in FIG. 1, a DVD recorder 100, an AV amplifier 200, and a TV 300 are HDMI-connected.

The DVD recorder 100 includes a single HDMI output port 100PO. The AV amplifier 200 includes a single HDMI input port 200PI and a single HDMI output port 200PO. The TV 300 includes a single HDMI input port 300PI.

The DVD recorder 100, the AV amplifier 200, and the TV 300 are connected via HDMI cables. The audio data and the video data are transmitted unidirectionally via the HDMI output port 100PO, the HDMI input port 200PI, the HDMI output port 200PO, and the HDMI input port 300PI in this order. Moreover, a control message is transmitted bidirectionally over a control signal bus on HDMI. Here, note that the present system is in a state where video is outputted from the TV 300 and audio is outputted from the AV amplifier 200 (referred to as the "theater mode" hereafter) (on the other hand, a state where both audio and video are outputted from the TV is referred to as the "TV mode").

FIG. 2 is a diagram for explaining operations of the devices in the conventional HDMI-connected audio-video output system. The horizontal axis in the diagram indicates the passage of time (the same applies to FIGS. 3, 11, 12, and 17 described later).

In the case where the maximum resolution of the video format supported by the TV 300 is 1080 p, the EDID shown in (f) describes information, as an initial value, indicating that 1080 p is supported and also describes a period of time taken before the video is outputted to a display device, namely, video latency. As the video latency, "100 ms" is set in the case of 1080 p. The detailed explanation of other descriptions in the EDID is omitted. It should be noted that since the TV 300 and the AV amplifier 200 are validly HDMI-connected, the HPD signal outputted from the TV 300 to the AV amplifier 200 is set to High as shown in (e).

In the theater mode, the AV amplifier 200 outputs the audio. In doing so, as shown in (f), the AV amplifier 200 adjusts (delays) the audio output according to the video latency obtained from the EDID read from the TV 300. Thus, the video latency is not set in the EDID of the AV amplifier 200 shown in (c) (or, set to "0 ms"). It should be noted that since the AV amplifier 200 and the DVD recorder 100 are validly HDMI-connected, the HPD signal outputted from the AV amplifier 200 to the DVD recorder 100 is set to High as shown in (b).

The DVD recorder 100 reads the EDID of the AV amplifier 200 that is shown in (c), and sends the audio and video data.

FIG. 3 is a diagram for explaining operations performed in the conventional HDMI-connected audio-video output system when an output format for the video data outputted from the DVD recorder 100 is changed.

The video latency caused in the case of standard-definition 480 p is smaller than the video latency caused in the case of high-definition 1080 p. Here, suppose that the format for the video data outputted from the DVD recorder 100 is changed from 1080 p to 480 p at a time T11. When the AV amplifier 200 adjusts timing of the audio output according to the video latency in the case of 1080 p, a synchronization error is caused between the audio output from the AV amplifier 200 and the video output from the TV 300 (that is, the audio output lags behind the video output). To address this, for example, when the TV 300 detects that the video latency is changed from 100 ms to 30 ms while receiving 480 p data and starting the video output after the time T11, the TV 300 temporarily changes the HPD signal to Low as shown in (e) (at a time T12). Then, while the HPD signal shown in (e) is Low, the TV 300 updates the video latency described in the EDID shown in (f) to, for example, 30 ms. After this, the TV 300 changes the HPD signal shown in (e) to High again (at a time T13).

When detecting that the HPD signal of the TV 300 shown in (e) is changed from Low to High (at the time T13), the AV amplifier 200 reads the EDID of the TV 300 shown in (f). Then, the AV amplifier 200 changes the HPD signal shown in (b) from Low to High (at a time T14).

When detecting that the HPD signal of the AV amplifier 200 shown in (b) is changed from Low to High (at the time T14), the DVD recorder 100 determines that a change may be occurring to the HDMI connection status. In order to adhere to the HDCP, the DVD recorder 100 starts the authentication as to whether or not the destination device is valid. When starting the authentication, the DVD recorder 100 stops outputting the audio and video data that requires content protection. Then, the DVD recorder 100 reads the EDID of the AV amplifier 200 shown in (c) again, and validates the AV amplifier 200 while transmitting the video data (such as blackout) that does not require content protection. After validating the AV amplifier 200, the DVD recorder 100 resumes outputting the audio and video data (at a time T15). The HDCP authentication is not a principal objective of the present invention, and therefore a detailed explanation thereof is omitted.

As described thus far, according to the audio-video data synchronization method described in Non-Patent Reference 1, whenever the video latency changes in the device for outputting the video, the EDID of the video output device is always rewritten. Then, the audio-video reproduction device stops outputting the audio and video data (i.e., the content) that requires content protection, and performs the HDCP authentication. As a result, the audio-video data synchronization method described in Non-Patent Reference 1 has a problem of causing a few seconds during which no content is outputted before the audio-video reproduction device completes the authentication and resumes outputting the audio and video data.

On the other hand, a method that does not employ the EDID has been proposed to address a lip-sync error caused between the outputs of the audio and video data (see Patent Reference 1, for example). Patent Reference 1 discloses a technique whereby information about the video latency is provided using a control message from a video output device (TV) to an audio output device (AV amplifier).

Non-Patent Reference 1: High-Definition Multimedia Interface Specification Version 1.3a Patent Reference 1: Japanese Unexamined Patent Application Publication No. 2006-33436

DISCLOSURE OF INVENTION

Problems that Invention is to Solve

As described above, the audio-video data synchronization method described in Non-Patent Reference 1 has a problem of causing a few seconds during which no content is outputted when the video latency changes in the device for outputting video.

Moreover, the technique disclosed in Patent Reference 1 has a problem of increasing the amount of control message transmission and thus complicating the processing.

The present invention is conceived in view of the stated problems and has an object to provide an audio-video data synchronization method and so forth capable of suppressing an increase in the amount of control message transmission and preventing the video output from being interrupted.

Means to Solve the Problems

In order to achieve the above object, the audio-video data synchronization method according to an aspect of the present invention is an audio-video data synchronization method of synchronizing audio outputted from an audio output device and video outputted from a video output device in an audio-video output system including the audio output device and the video output device which are interconnected via a predetermined interface, wherein the interface is capable of: unidirectionally transmitting video data from the audio output device to the video output device; unidirectionally transmitting, from the video output device to the audio output device, display identification data that indicates a reproduction capability of the video output device and connection validity status information that indicates validity status of a connection of the video output device; and bidirectionally transmitting a control message, the audio-video data synchronization method including: authenticating with the video output device when the indication of the connection validity status information changes from Invalid to Valid; sending the video data from the audio output device to the video output device via the interface while the connection validity status information indicates Valid, while the authentication performed in the authenticating is succeeding; outputting the video from the video output device, using the video data sent in the sending; obtaining, by the audio output device, a first latency that is a period of time taken for the video output device to output the video, by receiving the display identification data that includes information indicating the first latency from the video output device via the interface when the indication of the connection validity status information changes from Invalid to Valid; adjusting, by the audio output device, timing of outputting the audio according to the first latency obtained in the obtaining of a first latency; obtaining, by the video output device, a second latency which is a period of time taken to output the video in the outputting; notifying the audio output device of the second latency by sending a control message from the video output device via the interface when the connection validity status information indicates Valid, the control message including information that indicates the second latency obtained in the obtaining of a second latency; and adjusting, by the audio output device, timing of outputting the audio according to the second latency notified in the notifying.

With this, when the indication of the connection validity status information changes from Invalid to Valid, the audio output device can obtain the display identification data that includes the information indicating the first latency without transmission of a control message. Thus, an increase in the amount of control message transmission can be suppressed, and also the outputs of audio and video can be synchronized with each other. Moreover, when the connection validity status information indicates Valid, the audio output device can obtain, from the control message, the second latency which is the latency measured by the video output device. Therefore, a change in the connection status in order to obtain the display identification data is not required. That is to say, the connection validity status information does not need to be changed when indicating Valid. Thus, without unnecessary authentication, the video output can be prevented from being interrupted and the outputs of audio and video can be synchronized with each other.

Also, it is preferable that: the video output device includes a memory which is rewritable when the connection validity status information indicates Invalid and which stores the first latency; the display identification data that includes the information indicating the first latency stored in the memory is obtained in the obtaining of a first latency; and the first latency stored in the memory is not updated in the notifying.

With this, it becomes possible to synchronize audio and video using the first latency stored in the memory.

Moreover, it is preferable that the audio-video data synchronization method further includes: writing the second latency obtained in the obtaining of a second latency as the first latency into the memory, when the indication of the connection validity status information changes from Valid to Invalid.

With this, when the indication of the connection validity status information changes from Valid to Invalid, the first latency stored in the memory is updated. Thus, in the case where the latency at the time when the connection validity status information indicated Valid is to be maintained, the outputs of audio and video can be synchronized with each other immediately when the connection state becomes Valid again.

Furthermore, it is preferable that the first latency is a predetermined period depending on the video output device.

With this, the predetermined period depending on the video output device is set as the first latency. Thus, in the case where the video output device is highly likely to have the specific latency, the outputs of audio and video can be synchronized with each other immediately when the connection state becomes Valid again.

Also, it is preferable that the second latency obtained in the obtaining of a second latency is notified as the first latency in the notifying, when the indication of the connection validity status information changes from Valid to Invalid.

With this, the latency measured when the connection validity status information changes from Valid to Invalid is obtained as the first latency when the connection status becomes Valid again. Thus, when the connection state becomes Valid again, the outputs of audio and video can be immediately synchronized with each other.

Moreover, it is preferable that the second latency obtained in the obtaining of a second latency is notified in the notifying when a difference value between: the first latency obtained in the obtaining of a first latency or a second latency having been previously notified in the notifying; and the second latency obtained in the obtaining of a second latency, exceeds a predetermined threshold value.

With this, when a difference value between the first latency or the previously-notified second latency and the measured second latency exceeds the predetermined threshold value, the second latency measured in the video output device is notified. Thus, when the latency measured in the video output device deviates from the latency being used by the audio output device, the outputs of audio and video can be immediately synchronized with each other.

Furthermore, it is preferable that the audio-video data synchronization method further includes requesting a transmission of the second latency by sending a control message that includes information of the transmission request from the audio output device to the video output device, wherein the second latency is notified in the notifying when the control message is sent in the requesting.

With this, the audio output device can easily synchronize the outputs of audio and video using the latency at an arbitrary timing.

The audio-video data synchronization method according to another aspect of the present invention is an audio-video data synchronization method of synchronizing audio outputted from an audio output device and video outputted from a video output device in an audio-video output system including the audio output device and the video output device which are interconnected via a predetermined interface, a first audio cable, and a second audio cable, wherein the interface is capable of: unidirectionally transmitting video data and first audio data from the audio output device to the video output device; and bidirectionally transmitting a control message, the first audio cable is capable of transmitting second audio data from the video output device to the audio output device, and the second audio cable is capable of transmitting third audio data from the video output device to the audio output device, the audio-video data synchronization method including: sending, from the video output device to the audio output device: a first latency which is a period of time taken for the video output device to output the video; a second latency which is a period of time taken to output the video when the audio output device outputs the second audio data transmitted via the first audio cable; and a third latency which is a period of time taken to output the video when the audio output device outputs the third audio data transmitted via the second audio cable; specifying an audio switching to output the audio using one of the first audio data transmitted via the interface, the second audio data transmitted via the first audio cable, and the third audio data transmitted via the second audio cable; and adjusting timing of outputting the audio according to the first latency sent in the sending when the audio output using the first audio data is specified in the specifying, adjusting timing of outputting the audio according to the second latency sent in the sending when the audio output using the second audio data is specified in the specifying, and adjusting timing of outputting the audio according to the third latency sent in the sending when the audio output using the third audio data is specified in the specifying, each the adjusting being performed by the audio output device.

With this, the latency depending on the individual transmission line is sent to the audio output device. Thus, even when the output audio is changed in the audio output device, the outputs of the audio and video can be immediately synchronized with each other. Moreover, since the control message does not need to be sent whenever the output audio is changed in the audio output device, it becomes possible to suppress an increase in the amount of control message transmission.

The video output device according to an aspect of the present invention is a video output device which is connected to an audio output device via a predetermined interface, wherein the interface is capable of: unidirectionally transmitting video data from the audio output device to the video output device; unidirectionally transmitting, from the video output device to the audio output device, display identification data that indicates a reproduction capability of the video output device and connection validity status information that indicates validity status of a connection of the video output device; and bidirectionally transmitting a control message, the video output device including: a video data receiving unit which receives the video data from the audio output device via the interface; a video output unit which outputs video using the video data received by the video data receiving unit; a first latency sending unit which sends the display identification data that includes information indicating a first latency that is a period of time taken for the video output unit to output the video, to the audio output device via the interface when the indication of the connection validity status information changes from Invalid to Valid; and a second latency sending unit which sends a control message that includes information indicating a second latency that is a period of time taken for the video output unit to output the video, to the audio output device via the interface when the connection validity status information indicates Valid.

With this, the same advantageous effect as in the case of the aforementioned audio-video data synchronization method can be achieved.

The audio output device according to an aspect of the present invention is an audio output device which is connected to a video output device via a predetermined interface, wherein the interface is capable of: unidirectionally transmitting video data from the audio output device to the video output device; unidirectionally transmitting, from the video output device to the audio output device, display identification data that indicates a reproduction capability of the video output device and connection validity status information that indicates validity status of a connection of the video output device; and bidirectionally transmitting a control message, the audio output device including: an authentication unit which authenticates with the video output device, when the indication of the connection validity status information changes from Invalid to Valid; a video data sending unit which sends the video data to the video output device via the interface while the connection validity status information indicates Valid, while the authentication performed by the authentication unit is succeeding; a first latency receiving unit which receives the display identification data that includes information indicating a first latency that is a period of time taken for the video output device to output the video, from the video output device via the interface when the indication of the connection validity status information changes from Invalid to Valid; a second latency receiving unit which receives a control message that includes information indicating a second latency that is a period of time taken for the video output device to output the video, from the video output device via the interface when the connection validity status information indicates Valid; and an audio output unit which adjusts timing of outputting audio according to one of the first latency received by the first latency receiving unit and the second latency received by the second latency receiving unit.

With this, the same advantageous effect as in the case of the aforementioned audio-video data synchronization method can be achieved.

The audio-video output system according to an aspect of the present invention is an audio-video output system including an audio output device and a video output device which are interconnected via a predetermined interface, wherein the interface is capable of: unidirectionally transmitting video data from the audio output device to the video output device; unidirectionally transmitting, from the video output device to the audio output device, display identification data that indicates a reproduction capability of the video output device and connection validity status information that indicates validity status of a connection of the video output device; and bidirectionally transmitting a control message, the video output device including: a video data receiving unit which receives the video data from the audio output device via the interface; a video output unit which outputs video using the video data received by the video data receiving unit; a first latency sending unit which sends the display identification data that includes information indicating a first latency that is a period of time taken for the video output unit to output the video, to the audio output device via the interface when the indication of the connection validity status information changes from Invalid to Valid; and a second latency sending unit which sends a control message that includes information indicating a second latency that is a period of time taken to output the video, to the audio output device via the interface when the connection validity status information indicates Valid, the audio output device including: an authentication unit which authenticates with the video output device, when the indication of the connection validity status information changes from Invalid to Valid; a video data sending unit which sends the video data to the video output device via the interface while the connection validity status information indicates Valid, while the authentication performed by the authentication unit is succeeding; a first latency receiving unit which receives the display identification data that includes information indicating a first latency, from the video output device via the interface when the indication of the connection validity status information changes from Invalid to Valid; a second latency receiving unit which receives a control message that includes information indicating a second latency, from the video output device via the interface when the connection validity status information indicates Valid; and an audio output unit which adjusts timing of outputting audio according to one of the first latency received by the first latency receiving unit and the second latency received by the second latency receiving unit.

With this, the same advantageous effect as in the case of the aforementioned audio-video data synchronization method can be achieved.

Effects of the Invention

As apparent from the above explanation, the audio-video data synchronization method according to the present invention can suppress an increase in the amount of control message transmission and prevent the video output from being interrupted.

BRIEF DESCRIPTION OF DRAWINGS

FIG. 17 is a diagram for explaining operations of the devices included in the audio-video output system according to the second embodiment.

Figure 1:
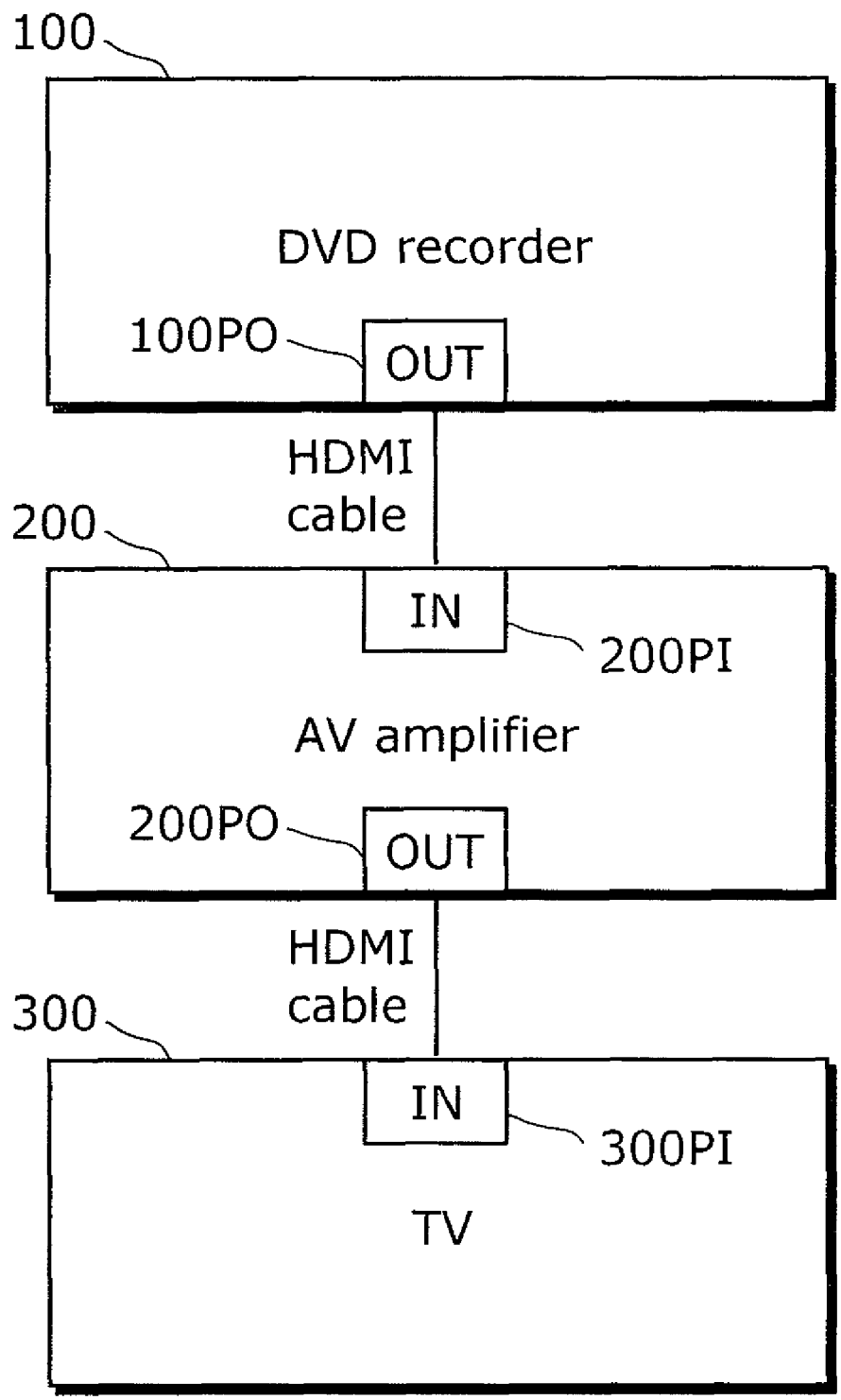
FIG. 1 is a diagram showing an example of a configuration of a conventional HDMI-connected audio-video output system.
Figure 2:
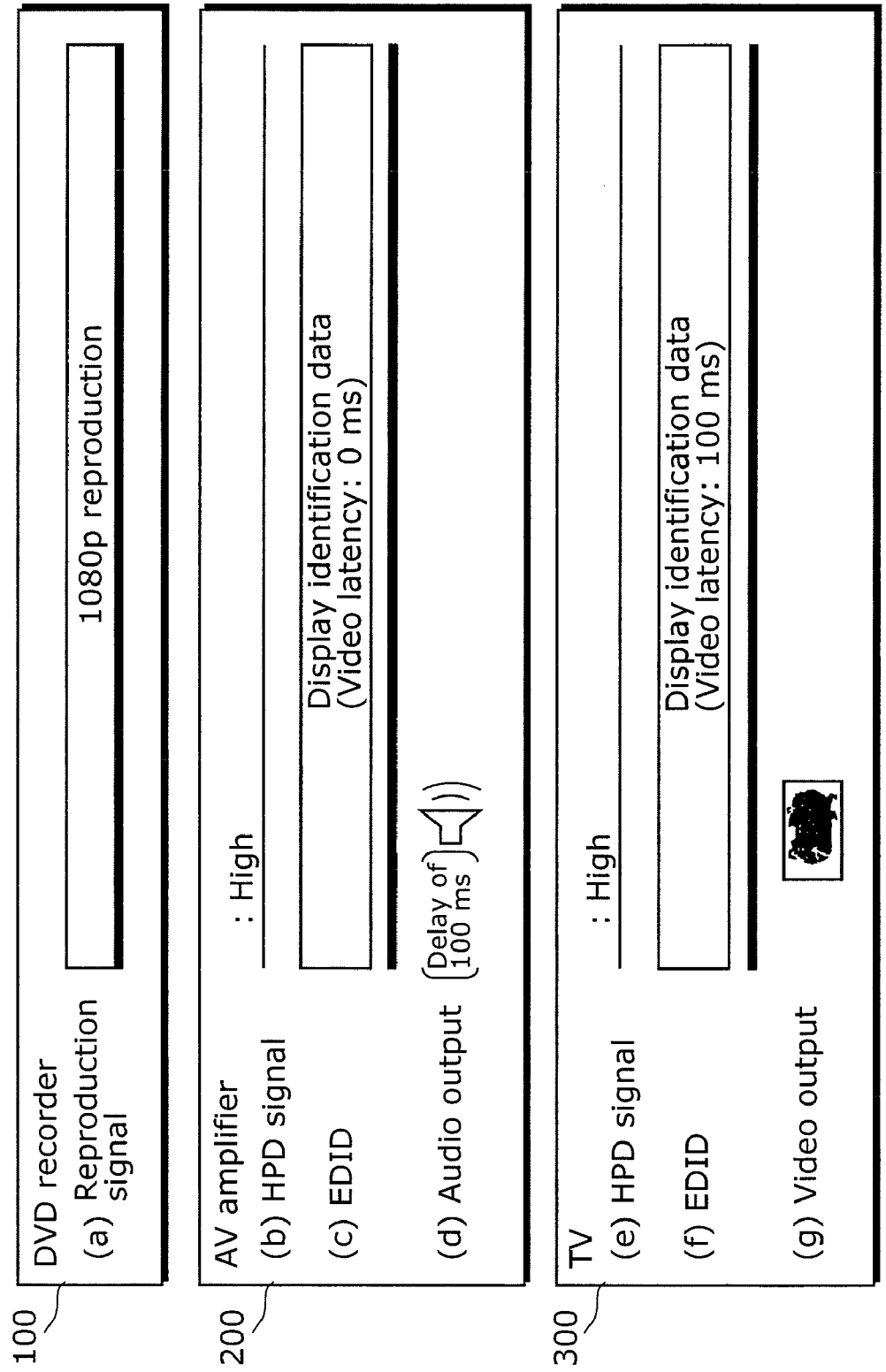
FIG. 2 is a diagram for explaining operations of devices in the conventional HDMI-connected audio-video output system.
Figure 3:
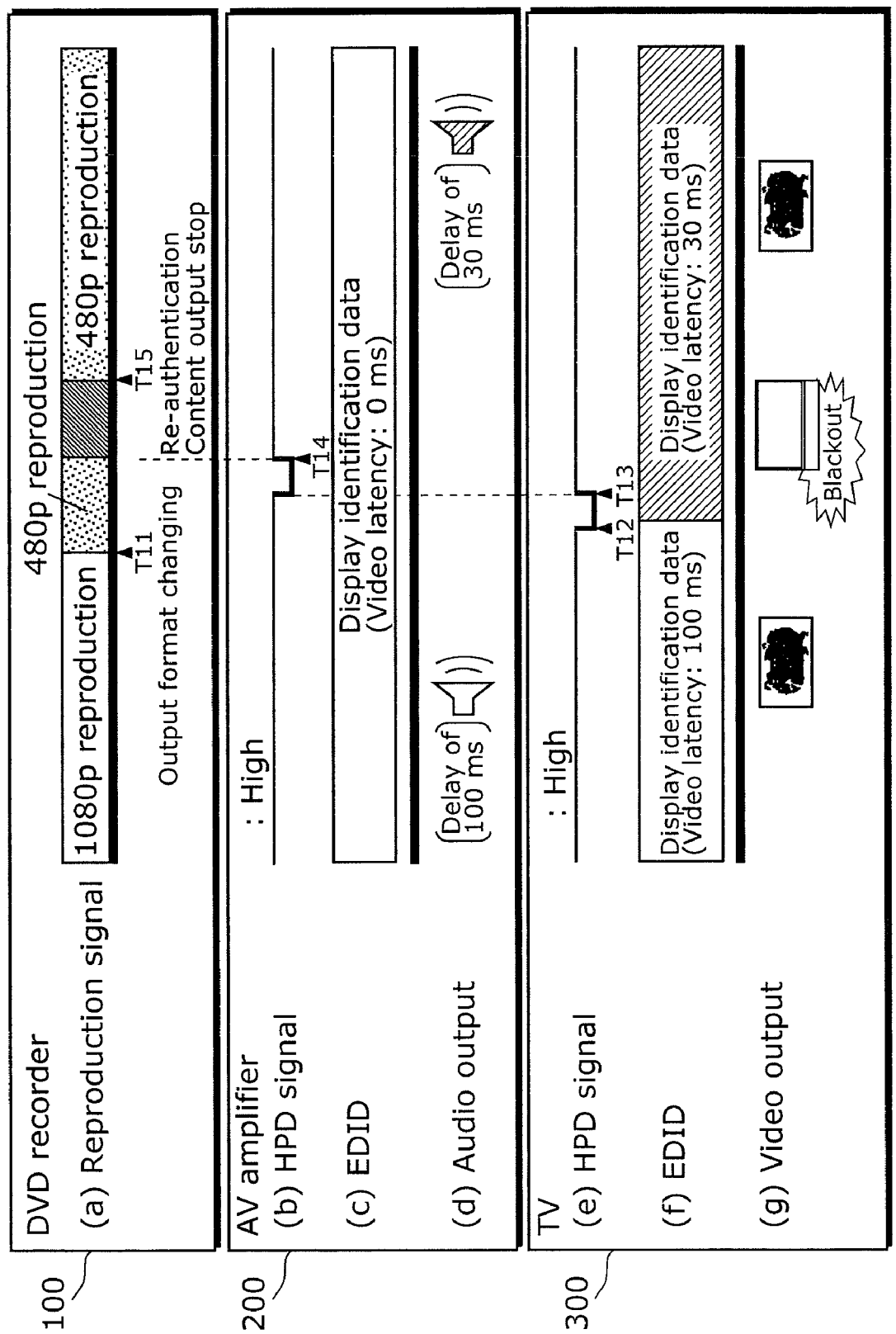
FIG. 3 is a diagram for explaining operations performed in the conventional HDMI-connected audio-video output system when an output format for video data is changed.

NUMERICAL REFERENCES 1, 2 Audio-video output system
10 DVD recorder
10PO, 20PO, 25PO HDMI output port
20, 25 AV amplifier
20PI, 25PI, 30PI, 35PI HDMI input port
25PIa Analog audio input port
25PId Optical digital audio input port
30, 35 TV
35POa Analog audio output port
35POd Optical digital audio output port
101, 201, 251 HDMI output unit
101a, 201a, 207a, 251a, 257a, 301a, 351a HPD terminal
101b, 201b, 207b, 251b, 257b, 301b, 351b DDC terminal
101c, 201c, 207c, 251c, 257c, 301c, 351c TMDS terminal
101d, 201d, 207d, 251d, 257d, 301d, 351d CEC terminal
102, 202, 252 HPD change detection unit
103, 203, 253 EDID information obtaining unit
104, 204, 254 Authentication-encryption unit
105, 205, 255, 307, 357 CEC device linking unit
106 Converting unit
107 TMDS encoding unit
108 TMDS output unit
205a, 255a Video latency obtaining unit
206, 256 TMDS output unit
207, 257, 301, 351 HDMI input unit
208, 258, 302, 352 EDID setting unit
209, 259, 303, 353 EDID memory unit
209a, 259a, 303a, 353a EDID
210, 260, 304, 354 HPD control unit
210a, 260a, 304a, 354a HPD signal
211, 261, 305, 355 TMDS input unit
212, 262, 306, 356 Authentication-decoding unit
213, 263, 308, 358 TMDS decoding unit
214, 264, 310, 360 Audio output unit
265 Optical digital audio input unit
266 Analog audio input unit
267 Audio input switching unit
307a, 357a Video latency setting unit
309, 359 Video output unit
361 Input switching unit
362 Tuner decoding unit
363 Optical digital audio output unit
364 Analog audio output unit

BEST MODES FOR CARRYING OUT THE INVENTION

The following is a detailed description of embodiments according to the present invention, with reference to the drawings.

First Embodiment

According to an audio-video synchronization method in the first embodiment of the present invention, when the video latency changes in a video output device because of, for example, a change in the video output format while a device connection for sending and receiving audio and video data is valid, the video output device sends a control message to provide notification of the changed video latency. To be more specific, the video output device does not change the video latency described in the EDID that is to be unidirectionally sent to an audio output device. This means that the video output device does not need to cause a disclosure trigger whereby the connection is temporality invalidated and then validated again using an HPD signal. The audio output device adjusts the timing of outputting audio, assigning a higher priority to the video latency notified later through the control message than the video latency obtained from the EDID read from the video output device at a connection start time.

That is, the video output device does not need to change (or pulse) the HPD signal, which is to be sent to the audio output device, from Low to High. Therefore, the audio output device does not need to change (or pulse) the HPD signal, which is to be sent to an audio-video reproduction device, from Low to High either. On this account, the audio-video reproduction device does not need to re-perform the HDCP authentication. Accordingly, the audio output device and the video output device can synchronize the audio and video outputs without temporal interruption.

Figure 4:
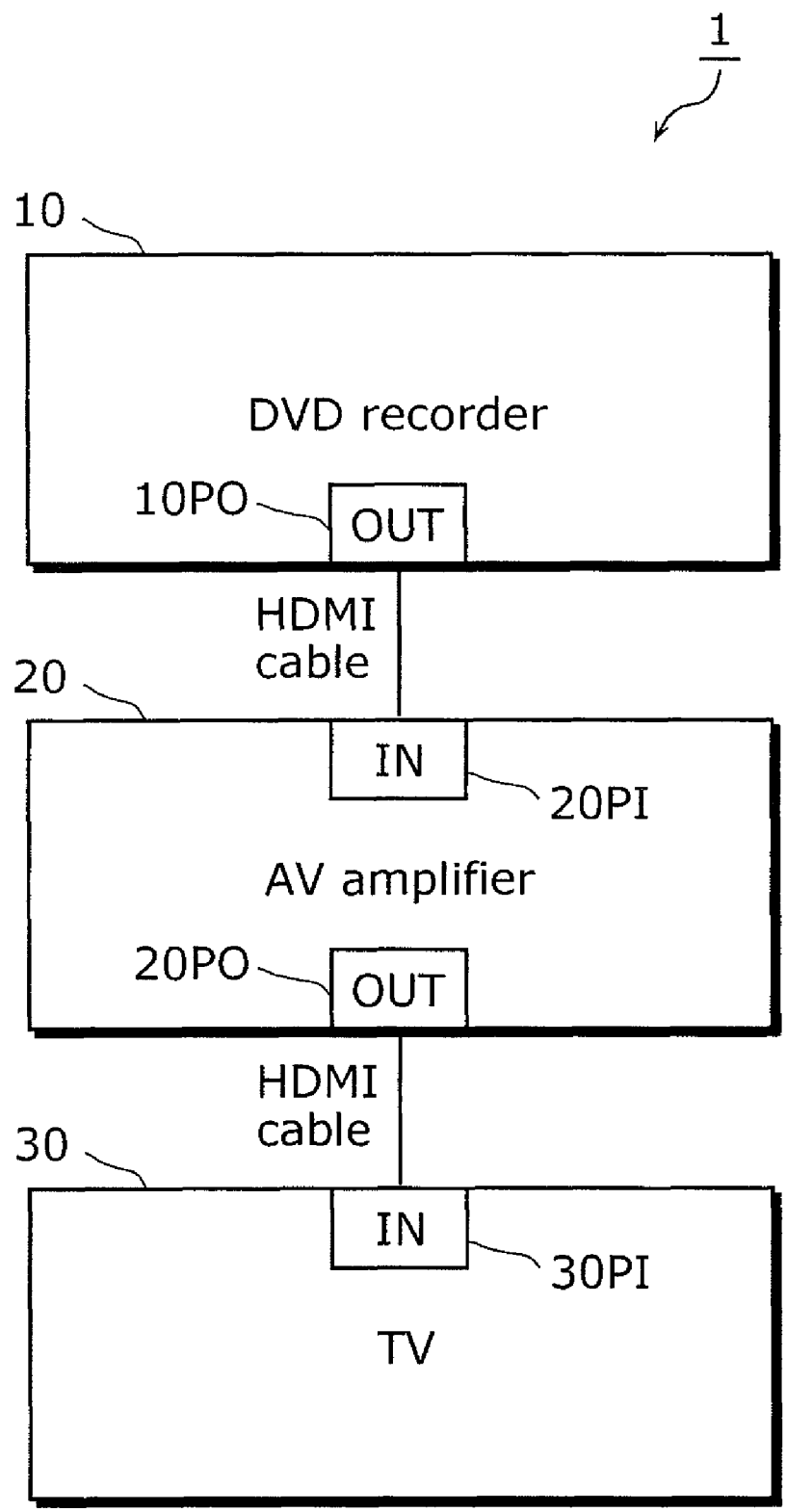
FIG. 4 is a diagram showing a configuration of an HDMI-connected audio-video output system according to a first embodiment of the present invention.

FIG. 4 is a diagram showing a configuration of an HDMI-connected audio-video output system 1 according to the first embodiment of the present invention. The audio-video output system 1 includes a DVD recorder 10, an AV amplifier 20, and a TV 30. These devices (the DVD recorder 10, the AV amplifier 20, and the TV 30) included in the audio-video output system 1 are interconnected by HDMI cables (also referred to simply as the "HDMI" hereafter).

The DVD recorder 10 is an example of an audio-video reproduction device for reproducing audio and video data, and includes an HDMI output port 10PO.

The AV amplifier 20 is an example of an audio output device for outputting audio, and includes an HDMI input port 20PI and an HDMI output port 20PO.

The TV 30 is an example of a video output device for outputting video, and includes an HDMI input port 30PI.

The HDMI output port 10PO and the HDMI input port 20PI are connected via the HDMI cable. The HDMI output port 20PO and the HDMI input port 30PI are connected via the HDMI cable.

These HDMI cables are capable of unidirectionally transmitting the audio and video data reproduced by the DVD recorder 10, to the AV amplifier 20 and then to the TV 30 in this order. Also, the HDMI is capable of transmitting display identification data that indicates a reproduction capability of the TV 30 and connection validity status information of the TV 30, unidirectionally from the TV 30 to the AV amplifier 20. Moreover, the HDMI is capable of transmitting a control message (referred to as the "CEC message" hereafter) bidirectionally between the interconnected devices.

Next, configurations of the devices that implement the audio-video data synchronization method in the present embodiment are explained, with reference to the drawings.

Figure 5:
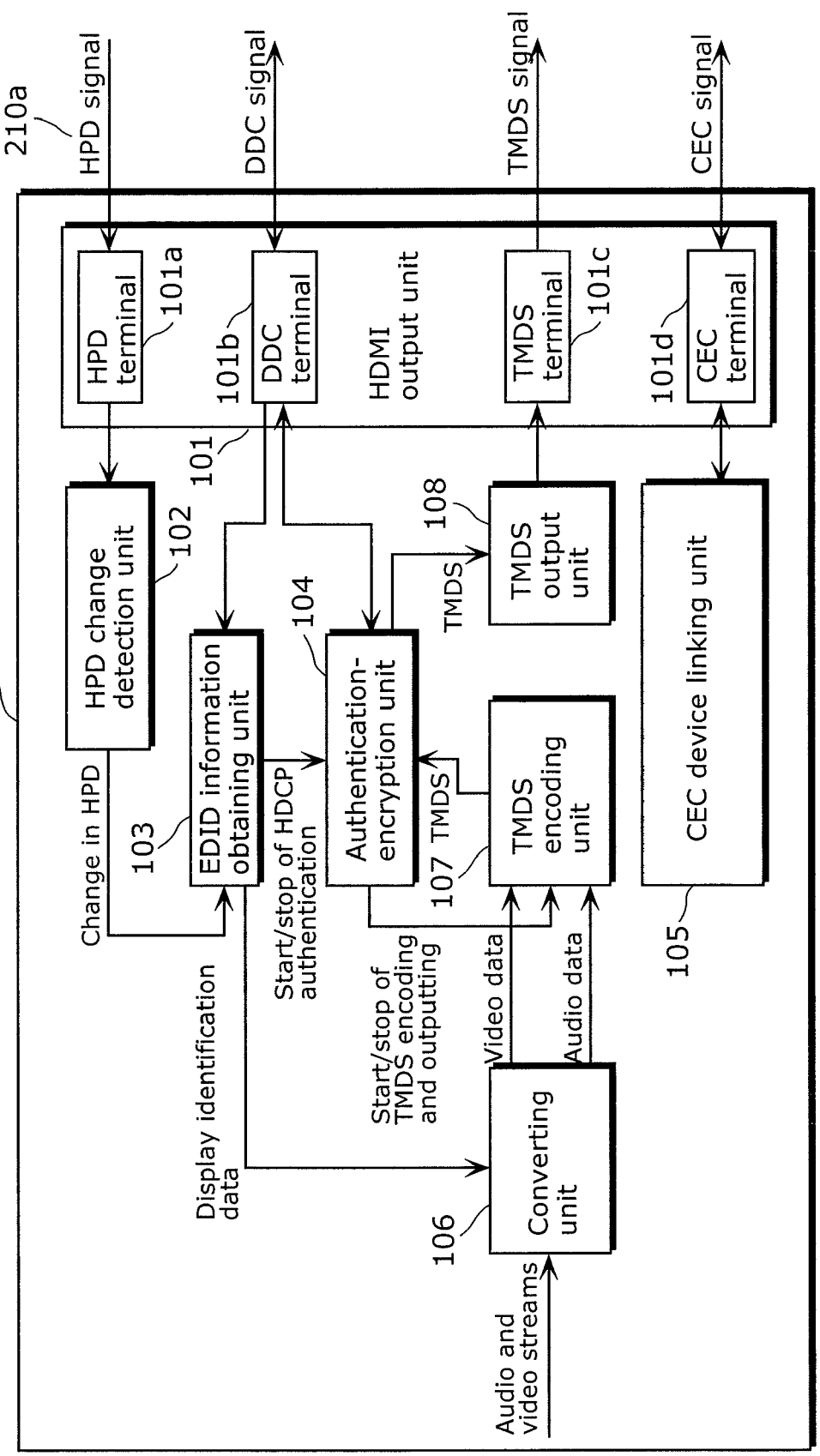
FIG. 5 is a block diagram showing a functional configuration of a DVD recorder according to the first embodiment of the present invention.

FIG. 5 is a block diagram showing a functional configuration of the DVD recorder 10 in the present embodiment.

As shown in FIG. 5, the DVD recorder 10 includes an HDMI output unit 101, an HPD change detection unit 102, an EDID information obtaining unit 103, an authentication-encryption unit 104, a CEC device linking unit 105, a converting unit 106, a TMDS (Transition-Minimized Differential Signaling) encoding unit 107, and a TMDS output unit 108.

The HDMI output unit 101 is configured by the HDMI output port 10PO, and sends audio and video data. Also, the HDMI output unit 101 sends and receives control messages (i.e., allows two-way communication). The HDMI output unit 101 has: an HPD terminal 101a which receives an HPD signal 210a; a DDC terminal 101b which communicates by DDC signals; a TMDS terminal 101c which sends a TMDS signal; and a CEC terminal 101d which communicates by CEC signals.

The HPD change detection unit 102 detects a change in the HPD signal 210a that is received via the HPD terminal 101a of the HDMI output unit 101. Here, the HPD signal is an example of the connection validity status information of the HDMI-connected device. In the present embodiment, a High HPD signal indicates a valid connection whereas a Low HPD signal indicates an invalid connection. The HPD change detection unit 102 detects a change in the HPD signal 210a from High to Low (a change from Valid to Invalid) or a change in the HPD signal 210a from Low to High (a change from Invalid to Valid).

When the HPD change detection unit 102 detects that the HPD signal 210a is changed from Low to High, the EDID information obtaining unit 103 communicates by DDC signals with the AV amplifier 20 via the DDC terminal 101b so as to obtain EDID 209a of the AV amplifier 20. The EDID 209a of the AV amplifier 20 describes the display identification data, such as audio and video data formats supportable by the AV amplifier 20. The EDID information obtaining unit 103 informs the display identification data to the converting unit 106. The EDID 209a of the AV amplifier 20 also describes whether or not the AV amplifier 20 is an HDMI device. On account of this, when the obtained EDID 209a describes that the AV amplifier 20 is an HDMI device, the EDID information obtaining unit 103 instructs the authentication-encryption unit 104 to start authentication with the AV amplifier 20 and also to apply HDCP for authenticating the AV amplifier 20. Then, when the HPD change detection unit 102 detects that the HPD signal 210a is changed from High to Low, the EDID information obtaining unit 103 instructs the authentication-encryption unit 104 to stop the authentication.

It should be note that the EDID 209a of the AV amplifier 20 in the present embodiment does not describe the video latency. However, EDID of an AV amplifier according to the present invention may describe the video latency compliant with the HDMI Standard Version 1.3a or may describe "0 ms" as the video latency.

Following the instruction for the authentication start from the EDID information obtaining unit 103, the authentication-encryption unit 104 validates the AV amplifier 20. In other words, the authentication-encryption unit 104 verifies whether or not the AV amplifier 20 is an authorized device compliant with HDCP. To be more specific, the authentication-encryption unit 104 performs the authentication processing according to the HDCP authentication protocol by using the DDC signals with the AV amplifier 20 via the DDC terminal 101b. Since a TMDS output is necessary for the authentication, the authentication-encryption unit 104 first sends the data obtained by performing TMDS-encoding on content data that does not need copyright protection, to the TMDS output unit 108. Here, the content data that does not need copyright protection refers to, for example, data of a blackout picture showing an image in all black.

While the authentication with the AV amplifier 20 performed by the authentication-encryption unit 104 is succeeding, the authentication-encryption unit 104 instructs the TMDS encoding unit 107 to generate TMDS transmission data. Then, the authentication-encryption unit 104 encrypts the TMDS transmission data generated by the TMDS encoding unit 107 using the successful authentication information, so as to generate encrypted TMDS transmission data. After this, the authentication-encryption unit 104 sends the encrypted TMDS transmission data to the TMDS output unit 108.

On the other hand, when the authentication with the AV amplifier 20 performed by the authentication-encryption unit 104 fails, the DVD recorder 10 cannot output, to the AV amplifier 20, content data which needs copyright protection. For this reason, the authentication-encryption unit 104 instructs the TMDS encoding unit 107 to stop the TMDS encoding of the audio and video data and to stop the output of the TMDS transmission data to the authentication-encryption unit 104.

The CEC device linking unit 105 sends and receives CEC messages to and from the HDMI-connected device by using CEC signals via the CEC terminal 101d.

The converting unit 106 converts an audio stream and a video stream on the basis of the display identification data obtained from the EDID information obtaining unit 103, so as to generate audio data and video data. Then, the converting unit 106 sends the generated audio and video data to the TMDS encoding unit 107.

Following the instruction from the authentication-encryption unit 104, the TMDS encoding unit 107 performs TMDS encoding on the audio and video data obtained from the converting unit 106 so as to generate TMDS transmission data. Then, the TMDS encoding unit 107 sends the generated TMDS transmission data to the authentication-encryption unit 104.

The TMDS output unit 108 outputs, to the AV amplifier 20, the encrypted TMDS transmission data obtained from the authentication-encryption unit 104 or the unencrypted TMDS transmission data, by sending the TMDS signal via the TMDS terminal 101c.

Figure 6:
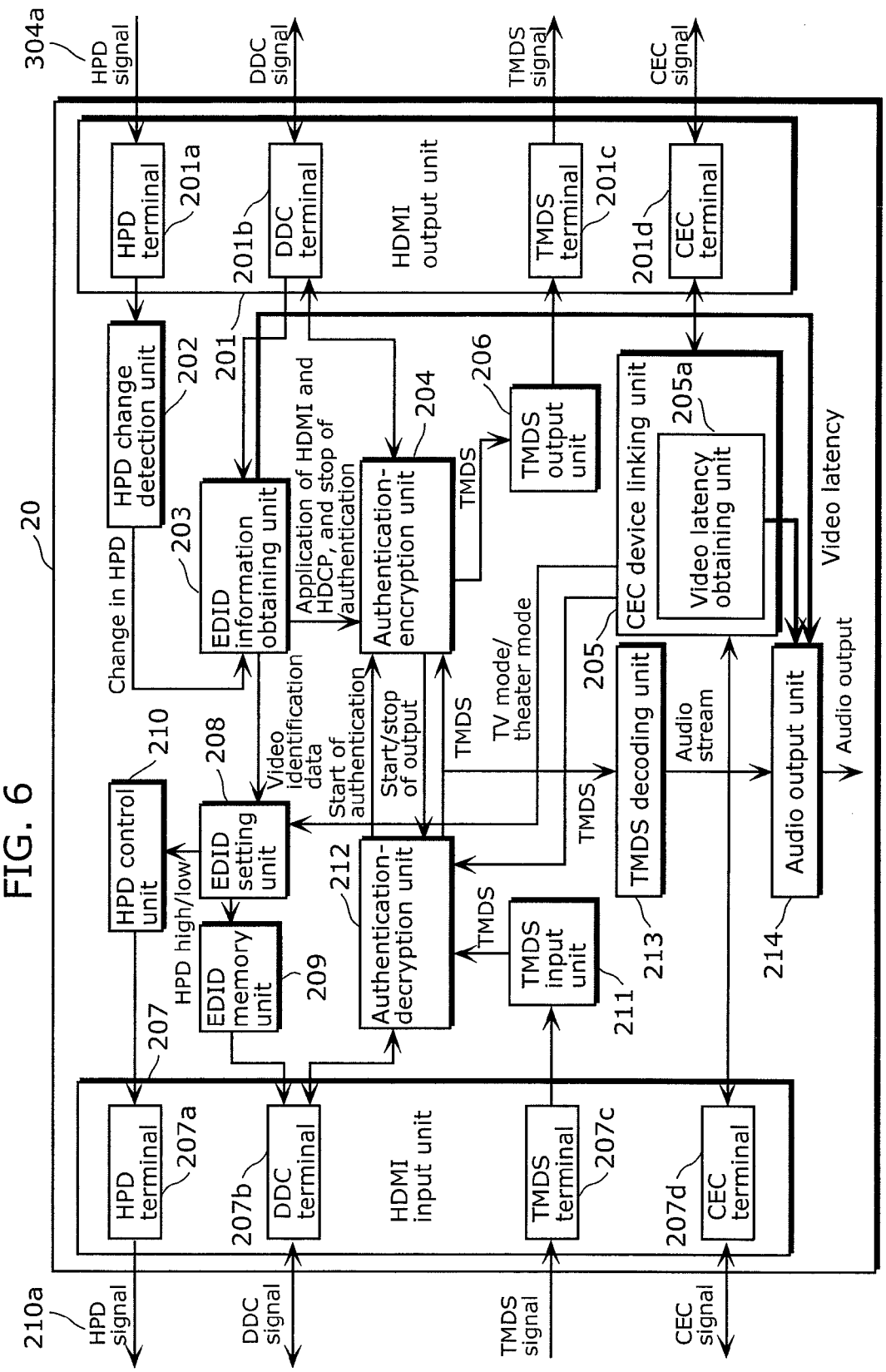
FIG. 6 is a block diagram showing a functional configuration of an AV amplifier according to the first embodiment of the present invention.

FIG. 6 is a block diagram showing a functional configuration of the AV amplifier 20 in the present embodiment.

As shown in FIG. 6, the AV amplifier 20 includes an HDMI output unit 201, an HPD change detection unit 202, an EDID information obtaining unit 203, an authentication-encryption unit 204, a CEC device linking unit 205, a TMDS output unit 206, an HDMI input unit 207, an EDID setting unit 208, an EDID memory unit 209, an HPD control unit 210, a TMDS input unit 211, an authentication-decryption unit 212, a TMDS decoding unit 213, and an audio output unit 214.

The HDMI output unit 201 is configured by the HDMI output port 20PO, and sends audio and video data. Also, the HDMI output unit 201 sends and receives control messages (i.e., allows two-way communication). The HDMI output unit 201 has: an HPD terminal 201a which receives an HPD signal 304a; a DDC terminal 201b which communicates by DDC signals; a TMDS terminal 201c which sends a TMDS signal; and a CEC terminal 201d which communicates by CEC signals.

The HPD change detection unit 202 detects that the indication of the connection validity status information changes from Invalid to Valid or from Valid to Invalid. To be more specific, the HPD change detection unit 202 detects a change in the HPD signal 304a that is received via the HPD terminal 201a of the HDMI output unit 201. That is, the HPD change detection unit 202 detects a change in the HPD signal 304a from High to Low (a change from Valid to Invalid) or a change in the HPD signal 304a from Low to High (a change from Invalid to Valid).

The EDID information obtaining unit 203 is an example of a first latency obtaining unit. When the HPD change detection unit 202 detects that the HPD signal 304a is changed from Low to High, the EDID information obtaining unit 203 communicates by the DDC signals with the TV 30 via the DDC terminal 201b so as to obtain EDID 303a of the TV 30. The EDID 303a of the TV 30 describes the display identification data that includes information about audio and video data formats supportable by the TV 30 and about the video latency of the TV 30. Here, the video latency is a period of time necessary for the TV 30 to output the video. For example, the video latency is a period of time taken from when the video data is received to when the video based on the received video data is outputted to a display. The EDID information obtaining unit 203 informs this display identification data to the EDID setting unit 208 and the audio output unit 214. The EDID 303a of the TV 30 also describes that the TV 30 is an HDMI device. On account of this, when the EDID 303a describes that the TV 30 is an HDMI device, the EDID information obtaining unit 203 instructs the authentication-encryption unit 204 to apply HDCP for authenticating the TV 30. Here, note that the EDID information obtaining unit 203 gives the instruction only to apply HDCP, and thus does not give an instruction to start the authentication. When the HPD change detection unit 202 detects that the HPD signal 304a is changed from High to Low, the EDID information obtaining unit 203 instructs the authentication-encryption unit 204 to stop the authentication.

Following the instruction for the authentication start from the authentication-decryption unit 212, the authentication-encryption unit 204 validates the TV 30. To be more specific, the authentication-encryption unit 204 performs the authentication processing according to the HDCP authentication protocol by using the DDC signals with the TV 30 via the DDC terminal 201b. Since a TMDS output is necessary for the authentication, the authentication-encryption unit 204 first sends the data obtained by performing TMDS-encoding on content data that does not need copyright protection, to the TMDS output unit 206.

While the authentication with the TV 30 performed by the authentication-encryption unit 204 is succeeding, the authentication-encryption unit 204 instructs the authentication-decryption unit 212 to output the TMDS transmission data. Then, the authentication-encryption unit 204 encrypts the TMDS transmission data decrypted by the authentication-decryption unit 212 using the successful authentication information, so as to generate encrypted TMDS transmission data. After this, the authentication-encryption unit 204 sends the encrypted TMDS transmission data to the TMDS output unit 206.

On the other hand, when the authentication with the TV 30 performed by the authentication-encryption unit 204 fails, the AV amplifier 20 cannot output, to the TV 30, content data which needs copyright protection. For this reason, the authentication-encryption unit 204 instructs the authentication-decryption unit 212 to stop the output of the TMDS transmission data.

The CEC device linking unit 205 sends and receives CEC messages to and from the TV 30 and the DVD recorder 10 by using CEC signals via the CEC terminal 201d and the CEC terminal 207d. Moreover, the CEC device linking unit 205 detects a TV mode setting or a theater mode setting by sending and receiving the CEC messages to and from the TV 30. Then, the CEC device linking unit 205 notifies the EDID setting unit 208 and the authentication-decryption unit 212 of the information regarding the detected TV mode or theater mode setting as the setting information.

Moreover, the CEC device linking unit 205 has a video latency obtaining unit 205a. The video latency obtaining unit 205a is an example of a second latency receiving unit, and receives a CEC message from the TV 30 instructing to change the video latency. The video latency obtaining unit 205a outputs the video latency obtained from the received CEC message to the audio output unit 214.

The TMDS output unit 206 is an example of a video data sending unit. The TMDS output unit 206 outputs, to the TV 30, the encrypted TMDS transmission data obtained from the authentication-encryption unit 204 or the unencrypted TMDS transmission data, by sending the TMDS signal to the TV 30 via the TMDS terminal 201*c*. To be more specific, while the HPD signal 304*a* indicates Valid, the TMDS output unit 206 sends the TMDS transmission data including the video data to the TV 30 via the HDMI output unit 201.

The HDMI input unit 207 is configured by the HDMI input port 20PI, and receives audio and video data. Also, the HDMI input unit 207 sends and receives control messages (i.e., allows two-way communication). The HDMI input unit 207 has: an HPD terminal 207*a* which sends an HPD signal 210*a*; a DDC terminal 207*b* which communicates by DDC signals; a TMDS terminal 207*c* which receives a TMDS signal; and a CEC terminal 207*d* which communicates by CEC signals.

When obtaining the display identification data from the EDID information obtaining unit 203, the EDID setting unit 208 determines a description of the EDID 209*a* based on the setting information (TV mode or theater mode) notified by the CEC device linking unit 205. Here, when the determined description is different from the existing description of the EDID 209*a*, the EDID setting unit 208 changes the description of the EDID 209*a* while the HPD signal 210*a* is Low. In the case where the HPD signal 210*a* is High when going to change the description of the EDID 209*a*, the EDID setting unit 208 instructs the HPD control unit 210 to change the HPD signal 210*a* to Low (HPD negate instruction). After changing the description of the EDID 209*a*, the EDID setting unit 208 instructs the HPD control unit 210 to change the HPD signal 210*a* to High (HPD assert instruction).

The EDID memory unit 209 is configured by, for example, a nonvolatile memory, and stores the EDID 209*a*. This EDID 209*a* includes the display identification data.

Following the HPD assert instruction or the HPD negate instruction from the EDID setting unit 208, the HPD control unit 210 changes the HPD signal 210*a*, which is to be sent via the HPD terminal 207*a*, to High (Valid) or Low (Invalid).

The TMDS input unit 211 receives the encrypted TMDS transmission data sent from the DVD recorder 10, via the TMDS terminal 207*c*. Then, the TMDS input unit 211 outputs the encrypted TMDS transmission data to the authentication-decryption unit 212.

The authentication-decryption unit 212 responses to the authentication processing compliant with the authentication protocol that is performed on the AV amplifier 20 by the DVD recorder 10. When the DVD recorder 10 starts the authentication processing, the authentication-decryption 212 instructs the authentication-encryption unit 204 to start the authentication processing with the TV 30. Since a TMDS input is necessary for the authentication response, the authentication-decryption unit 212 obtains, from the TMDS input unit 211, the TMDS transmission data which does not need copyright protection and has not been encrypted. While the authentication with the AV amplifier 20 is succeeding, the authentication-decryption unit 212 obtains the encrypted TMDS transmission data from the TMDS input unit 211. The authentication-decryption unit 212 decrypts the obtained encrypted TMDS transmission data so as to generate (unencrypted) TMDS transmission data. Here, on the basis of the setting information (TV mode or theater mode) notified by the CEC device linking unit 205, the authentication-decryption unit 212 outputs the generated TMDS transmission data to, for example, the authentication-encryption unit 204. To be more specific, when the setting information indicates the theater mode, the authentication-decryption unit 212 outputs the decrypted TMDS transmission data to the authentication-encryption unit 204 and to the TMDS decoding unit 213. The authentication-decryption unit 212 may output data obtained by replacing the audio data from the decrypted TMDS transmission data with null audio data to the authentication-encryption unit 204. On the other hand, when the setting information indicates the TV mode, the authentication-decryption unit 212 outputs the decrypted TMDS transmission data to the authentication-encryption unit 204.

The TMDS decoding unit 213 performs TMDS decoding on the TMDS transmission data so as to generate an audio stream. Then, the TMDS decoding unit 213 outputs the generated audio stream to the audio output unit 214.

The audio output unit 214 is configured by a speaker or the like, and outputs audio using the audio stream generated by the TMDS decoding unit 213. Here, the audio output unit 214 adjusts (delays) the timing of the audio output according to the video latency obtained by the EDID information obtaining unit 203 or by the video latency obtaining unit 205*a*. It should be noted that when a plurality of video latencies are obtained by the EDID information obtaining unit 203 and the video latency obtaining unit 205*a*, the audio output unit 214 adjusts the timing of the audio output according to the latest video latency.

Figure 7:
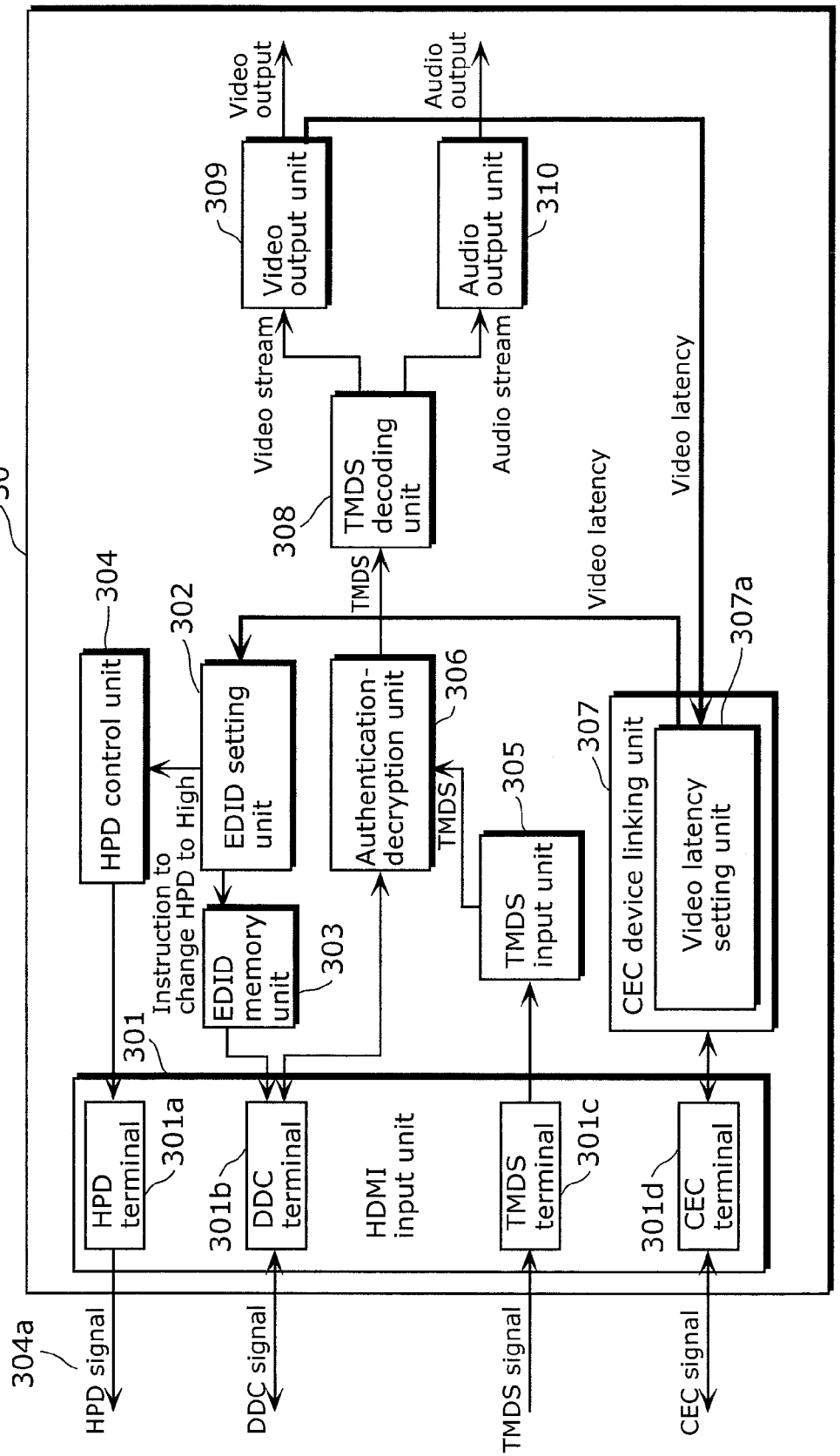
FIG. 7 is a block diagram showing a functional configuration of a TV according to the first embodiment of the present invention.

FIG. 7 is a block diagram showing a functional configuration of the TV 30 in the present embodiment.

The TV 30 includes an HDMI input unit 301, an EDID setting unit 302, an EDID memory unit 303, an HPD control unit 304, a TMDS input unit 305, an authentication-decryption unit 306, a CEC device linking unit 307, a TMDS decoding unit 308, a video output unit 309, and an audio output unit 310.

The HDMI input unit 301 is configured by the HDMI input port 30PI, and receives audio and video data. Also, the HDMI input unit 301 sends and receives control messages (i.e., allows two-way communication). The HDMI input unit 301 has: an HPD terminal 301*a* which sends an HPD signal 304*a*; a DDC terminal 301*b* which communicates by DDC signals; a TMDS terminal 301*c* which receives a TMDS signal; and a CEC terminal 301*d* which communicates by CEC signals.

The EDID setting unit 302 determines a description of the EDID 303*a* at power-on, for example, and sets the determined description to the EDID 303*a* stored in the EDID memory unit 303. Here, the EDID setting unit 302 sets a predetermined period depending on the TV 30 as the video latency, to the EDID 303*a*. For instance, the EDID setting unit 302 always sets the latency, 100 ms, as the fixed video latency. This latency, 100 ms, is caused when video is outputted at "1080 p" that is a video format at the maximum resolution out of the video formats supported by the TV 30. This is based on the assumption, for example, that when an HDMI output device obtains the display identification data of a destination HDMI input device in order to select data output formats, it is highly likely that the audio and video formats of the highest quality supported by both the HDMI output device and the HDMI input device are selected as the output formats. That is to say, by setting the latency in the case of the video format at the maximum resolution as the video latency, the audio-video output system 1 can enhance the possibility of synchronizing the audio and video outputs. Then, after setting the description of the EDID 303*a*, the EDID setting unit 302 instructs the HPD control unit 304 to change the HPD signal 304*a* to High (HPD assert instruction).

The EDID memory unit 303 is configured by, for example, a nonvolatile memory, and stores the EDID 303*a*. The display identification data that includes information indicating the video latency is set to the EDID 303a.

Following the HPD assert instruction from the EDID setting unit 302, the HPD control unit 304 changes the HPD signal 304a, which is to be sent to the AV amplifier 20 via the HPD terminal 301a, to High (Valid).

The TMDS input unit 305 receives the encrypted TMDS transmission data sent from the AV amplifier 20, via the TMDS terminal 301c of the HDMI input unit 301. Then, the TMDS input unit 305 outputs the encrypted TMDS transmission data to the authentication-decryption unit 306.

The authentication-decryption 306 responses to the authentication performed on the TV 30 by the AV amplifier 20. Since a TMDS input is necessary for the authentication response, the authentication-decryption unit 306 obtains, from the TMDS input unit 305, the TMDS transmission data which does not need copyright protection and has not been encrypted. While the authentication with the TV 30 is succeeding, the authentication-decryption unit 306 obtains the encrypted TMDS transmission data from the TMDS input unit 305. The authentication-decryption unit 306 decrypts the obtained encrypted TMDS transmission data so as to generate (unencrypted) TMDS transmission data. Then, the authentication-decryption unit 306 outputs the generated TMDS transmission data to the TMDS decoding unit 308.

The CEC device linking unit 307 sends and receives CEC messages to and from the AV amplifier 20 by using CEC signals via the CEC terminal 301d. Moreover, the CEC device linking unit 307 switches the setting between the TV mode and the theater mode by sending and receiving the CEC messages to and from the AV amplifier 20 and to and from the DVD recorder 10 via the AV amplifier 20, if necessary.

The CEC device linking unit 307 has a video latency setting unit 307a. The video latency setting unit 307a obtains the video latency from the video output unit 309. Suppose here that a difference value between: the video latency obtained from the video output unit 309; and the video latency set in the EDID 303a or the video latency that has been previously sent from the video latency setting unit 307a to the AV amplifier 20, exceeds a threshold value (0 to 50 ms, for example) that indicates a level felt as a lip-sync error to humans. In such a case, the video latency setting unit 307a sends the AV amplifier 20 a CEC message instructing to switch the video latency to the value obtained from the video output unit 309.

The TMDS decoding unit 308 performs TMDS decoding on the TMDS transmission data so as to generate audio and video streams. Then, the TMDS decoding unit 308 outputs the generated audio and video streams to the audio output unit 310 and the video output unit 309, respectively.

The video output unit 309 outputs the video to an output medium, such as a display. Here, the video output unit 309 measures a period of time taken from when the TV 30 receives the encrypted TMDS transmission data to when the video is displayed on the output medium. Then, the video output device 309 notifies the video latency setting unit 307a of the measured period of time as the video latency.

The audio output unit 310 is configured by a speaker or the like, and outputs audio using the audio stream generated by the TMDS decoding unit 308.

Next, the audio-video data synchronization method implemented by the audio-video output system 1 configured as described above is explained, with reference to FIGS. 8 to 10.

Figure 8:
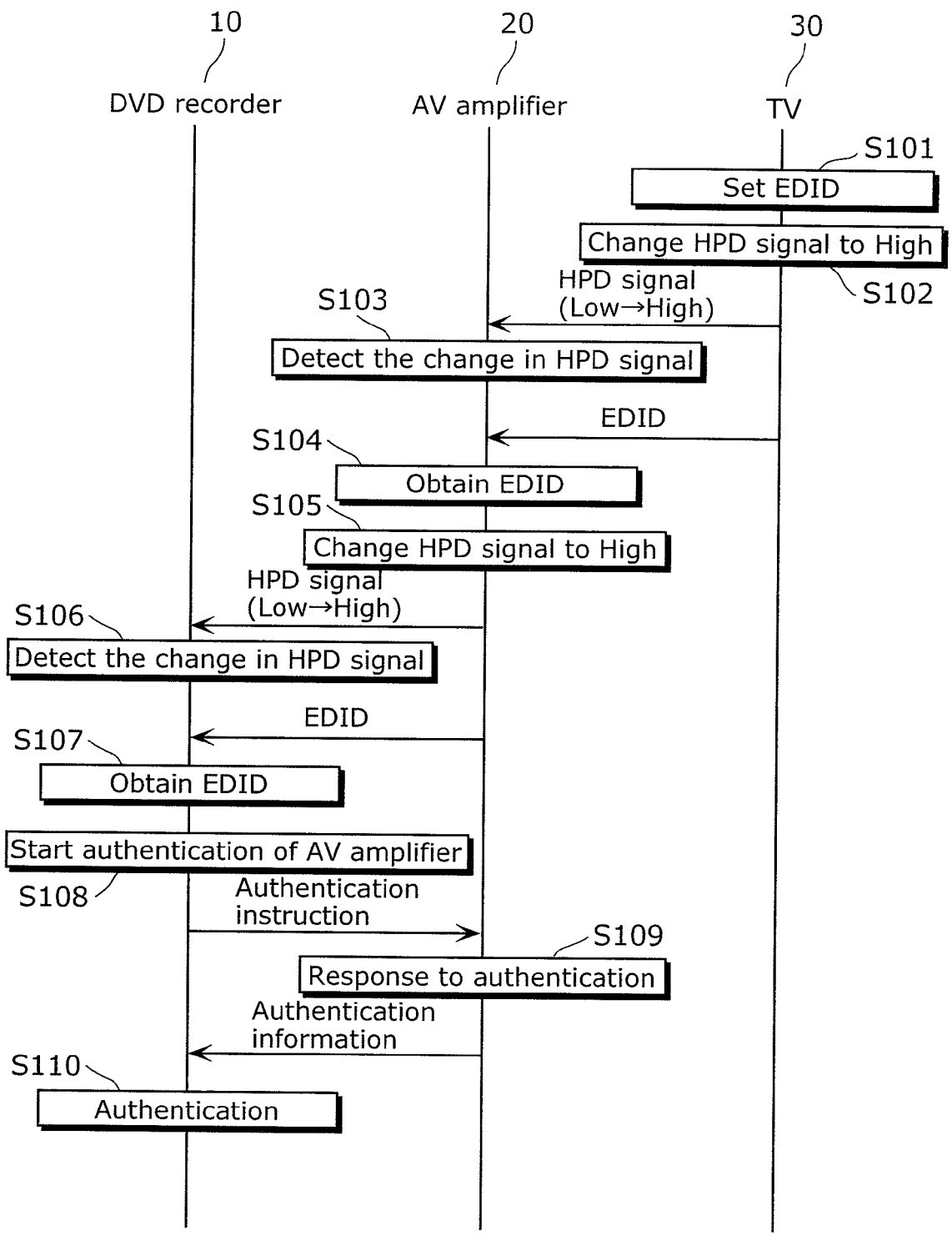
FIG. 8 is a diagram showing a flow of processing performed by the devices included the audio-video output system according to the first embodiment of the present invention.
Figure 9:
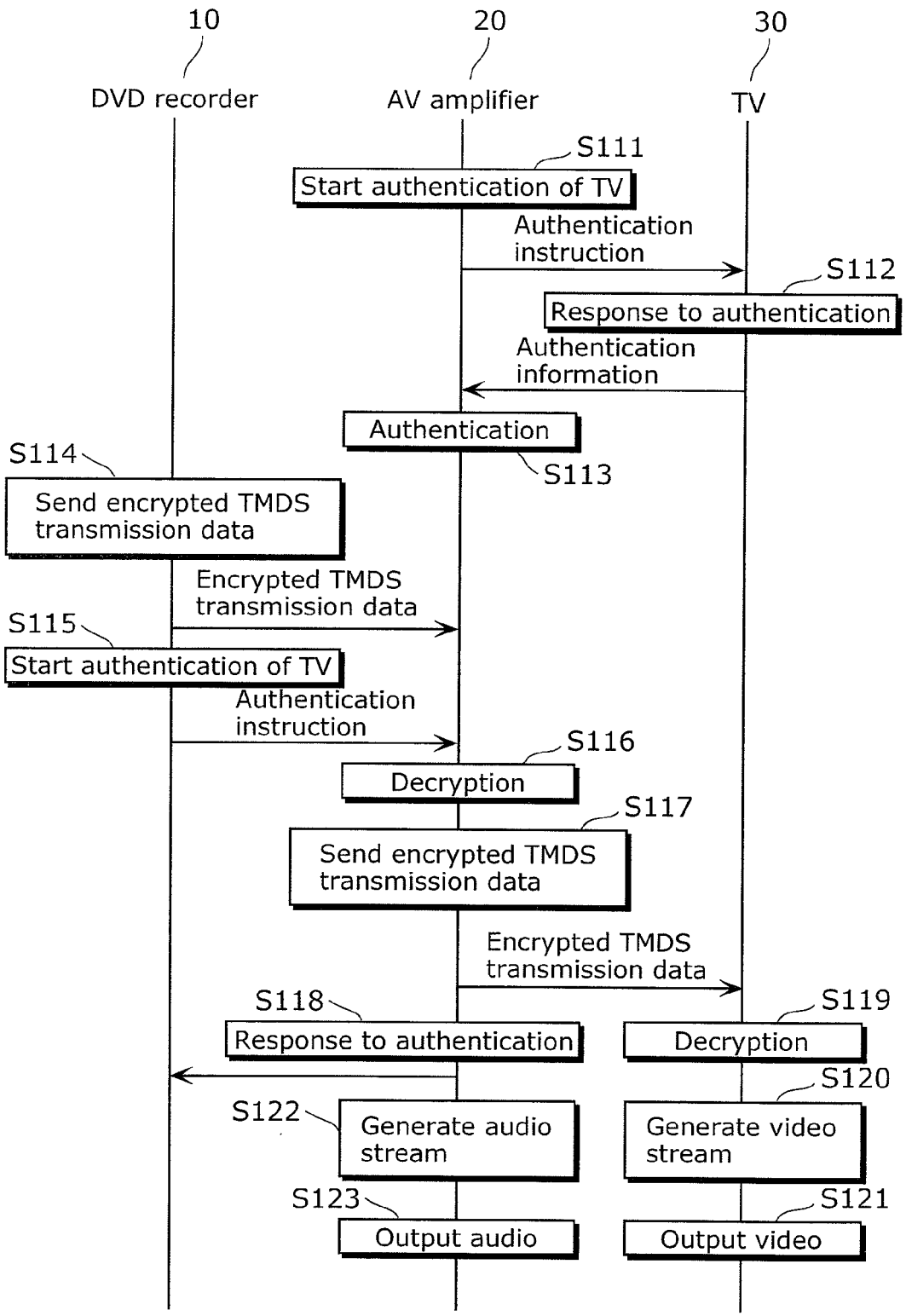
FIG. 9 is a diagram showing a flow of processing performed by the devices included the audio-video output system according to the first embodiment of the present invention.
Figure 10:
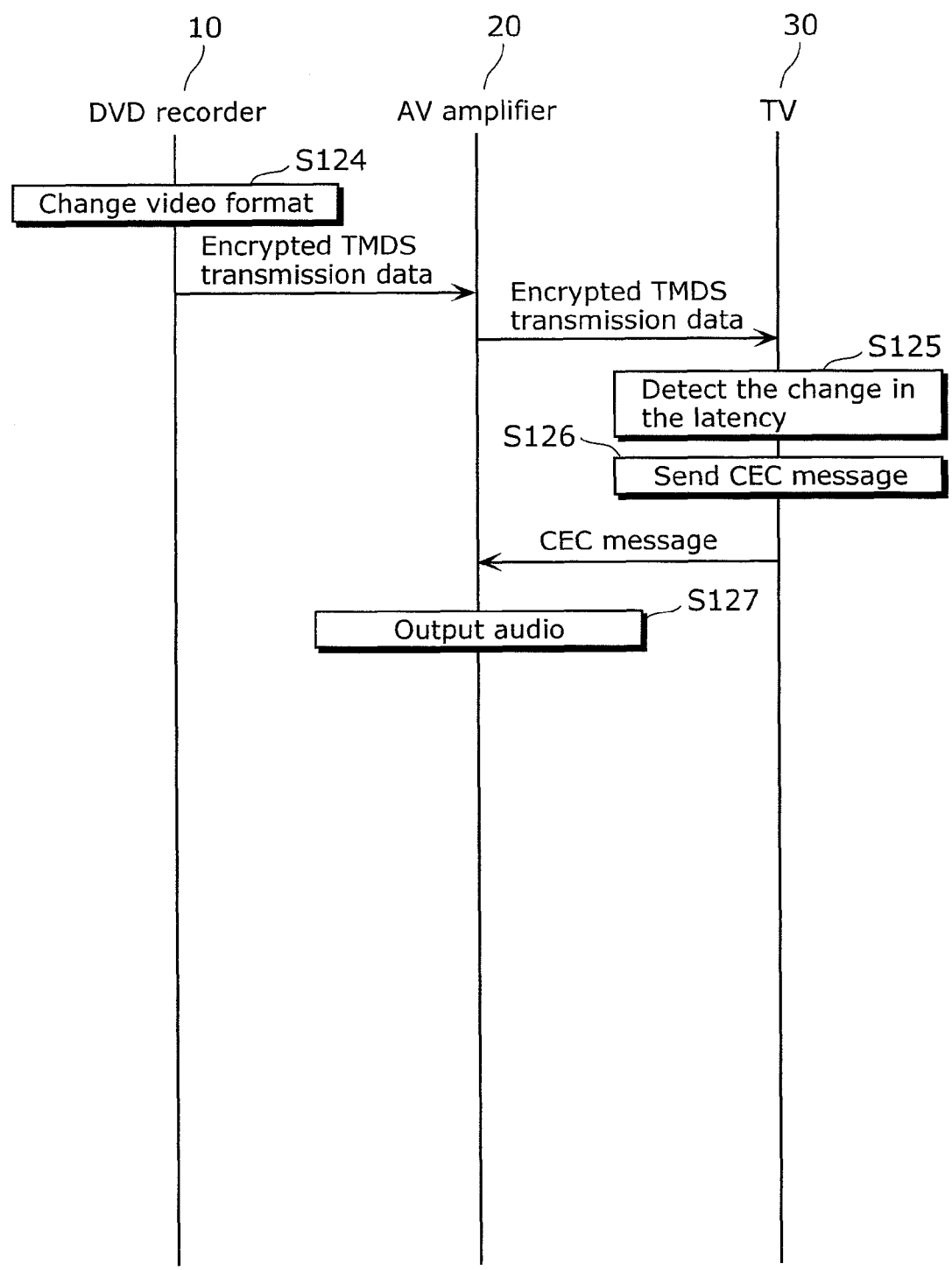
FIG. 10 is a diagram showing a flow of processing performed by the devices included the audio-video output system according to the first embodiment of the present invention.

FIGS. 8 to 10 are diagrams each showing a flow of processing performed by the devices included the audio-video output system 1 in the present embodiment. It should be noted that FIGS. 8 to 10 show the flows of processing in the case where the theater mode is selected in the audio-video output system 1.

Firstly, when the power of the TV 30 is turned on, for example, the EDID setting unit 302 of the TV 30 sets the video latency to the EDID 303a (step S101). Then, the HPD control unit 304 of the TV 30 changes the HPD signal 304a from Low to High (step S102).

The HPD change detection unit 202 of the AV amplifier 20 detects that the HPD signal 304a is changed from Low to High (step S103). Next, the EDID information obtaining unit 203 of the AV amplifier 20 obtains the EDID 303a stored in the EDID memory unit 303 of the TV 30 (step S104). More specifically, when the HPD signal 304a is changed from Low to High, the AV amplifier 20 obtains the EDID 303a from the TV 30 via the HDMI. This EDID 303a describes the display identification data which includes information indicating the video latency (the first latency) that is a period of time required for the TV 30 to output the video. The HPD control unit 210 of the AV amplifier 20 changes the HPD signal 210a from Low to High (step S105).

The HPD change detection unit 102 of the DVD recorder 10 detects that the HPD signal 210a is changed from Low to High (step S106). Next, the EDID information obtaining unit 103 of the DVD recorder 10 obtains the EDID 209a stored in the EDID memory unit 209 of the AV amplifier 20 (step S107). Then, the authentication-encryption unit 104 of the DVD recorder 10 starts the authentication processing to validate the AV amplifier 20 (step S108). Following the authentication instruction from the DVD recorder 10, the authentication-decryption unit 212 of the AV amplifier 20 sends the authentication information to the DVD recorder 10 (step S109). Then, the authentication-encryption unit 104 of the DVD recorder 10 authenticates the AV amplifier 20 using the received authentication information (step S110).

Next, the authentication-encryption unit 204 of the AV amplifier 20 starts the authentication with the TV 30 (step S111). Following the authentication instruction from the AV amplifier 20, the authentication-decryption unit 306 of the TV 30 sends the authentication information to the AV amplifier 20 (step S112). Then, the authentication-encryption unit 204 of the AV amplifier 20 authenticates the TV 30 using the received authentication information (step S113).

While the authentication with the AV amplifier 20 performed by the DVD recorder 10 is succeeding, the TMDS output unit 108 of the DVD recorder 10 sends the encrypted TMDS transmission data to the AV amplifier 20 (step S114). To be more specific, the TMDS encoding unit 107 of the DVD recorder 10 performs TMDS encoding on the audio and video data so as to generate the TMDS transmission data. Then, the authentication-encryption unit 104 of the DVD recorder 10 encrypts the generated TMDS transmission data using the authentication information of the AV amplifier 20, so as to generate the encrypted TMDS transmission data. The encrypted TMDS transmission data generated in this way is sent by the TMDS output unit 108 of the DVD recorder 10 to the AV amplifier 20 via the HDMI output unit 101. Also, the DVD recorder 10 authenticates the AV amplifier 20 to validate the TV 30 (step S115).

While the authentication with the TV 30 performed by the AV amplifier 20 is succeeding, the authentication-decryption unit 212 of the AV amplifier 20 decrypts the received encrypted TMDS transmission data (step S116). Following this, the TMDS output unit 206 of the AV amplifier 20 sends the encrypted TMDS transmission data to the TV 30 (step S117). To be more specific, the authentication-encryption unit 204 of the AV amplifier 20 encrypts the decrypted TMDS transmission data using the authentication information of the TV 30, so as to generate the encrypted TMDS transmission data. The encrypted TMDS transmission data generated in this way is sent by the TMDS output unit 206 of the AV amplifier 20 to the TV 30 via the HDMI output unit 201. Moreover, the AV amplifier 20 responses to the authentication from the DVD recorder 10 to validate the TV 30 (step S118).

It should be noted that the start of authentication performed by the AV amplifier 20 on the TV 30 (step S111) is after the start of authentication performed by the DVD recorder 10 on the AV amplifier 20 (step S108), and these authentications are executed in parallel.

The authentication-decryption unit 306 of the TV 30 decrypts the received encrypted TMDS transmission data (step S119). Then, the TMDS decoding unit 308 of the TV 30 performs TMDS decoding on the decrypted TMDS transmission data so as to generate the audio and video streams (step S120). The video output unit 309 outputs video using the generated video stream (step S121).

The TMDS decoding unit 213 of the AV amplifier 20 performs TMDS decoding on the decrypted TMDS transmission data to as to generate the audio stream (step S122). Then, the audio output unit 214 of the AV amplifier 20 adjusts the timing of the audio output according to the video latency described in the EDID 303*a* obtained in step S104, and accordingly outputs the audio to synchronize with the video outputted in step S121 (step S123).

Next, the converting unit 106 of the DVD recorder 10 changes the video format for the video data (step S124). For example, the converting unit 106 changes the video format, from 1080 p to 480 p. Then, as in steps S114 to S121, the video data in the changed video format is also sent to the TV 30 and the video is outputted using this video data. As a result, the video latency setting unit 307*a* of the TV 30 detects that the video latency has been changed (S125). For example, the audio output unit 309 measures a period of time taken for the video output and notifies the video latency setting unit 307*a* of the measure period of time as the video latency (the second latency). When the difference value between the measured video latency notified by the audio output unit 309 and the video latency obtained from the EDID 303*a* exceeds the threshold value, the video latency setting unit 307*a* detects that the video latency has been changed. Here, as the threshold value, a value (0 to 50 ms, for example) that corresponds to a level felt as a lip-sync error to humans may be used. It should be noted that although the video output unit 309 notifies the video latency setting unit 307*a* of the measured video latency, the video latency does not necessarily need to be measured. For instance, the video output unit 309 may obtain the video latency corresponding to the video format of the video being outputted, by reference to a table previously held in a memory included in the video output device. Then, the video output unit 309 may notify the video latency setting unit 307*a* of the obtained video latency.

The video latency setting unit 307*a* sends the AV amplifier 20 a CEC message instructing the AV amplifier 20 to change the video latency to the video latency obtained from the video output unit 309 (step S126). This instruction is transmitted to the AV amplifier 20 using, for example, a command of a CEC message (Vendor Command). It should be noted that the EDID setting unit 302 of the TV 30 does not update the video latency of the EDID 303*a* stored in the EDID memory 303 in this case.

Next, the audio output unit 214 of the AV amplifier 20 adjusts the timing of the audio output based on the video latency obtained from the CEC message, and accordingly outputs the audio to synchronize with the video outputted according to the changed video format (step S127).

Figure 11:
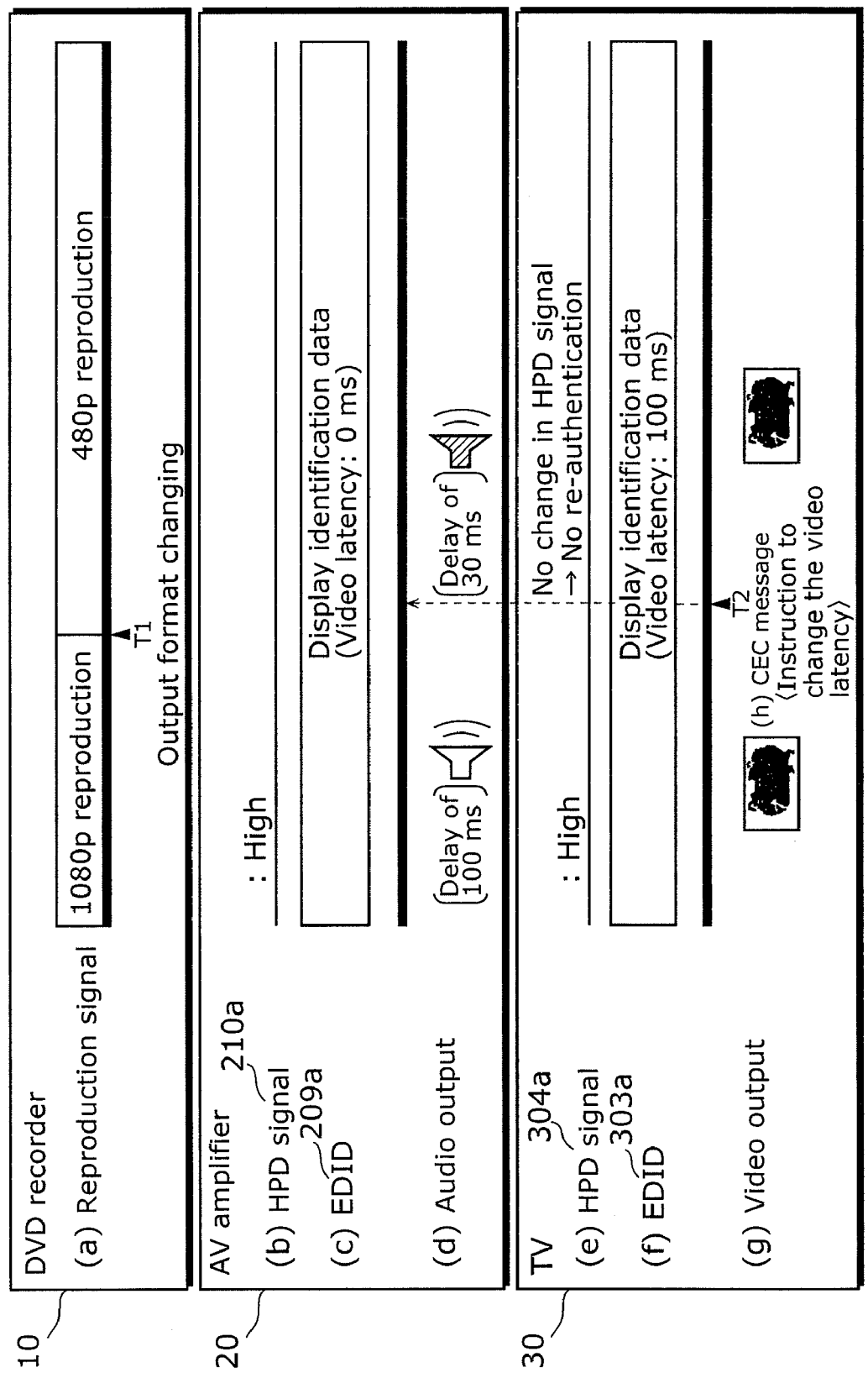
FIG. 11 is a diagram for explaining operations of the devices included the audio-video output system according to the first embodiment of the present invention.

Next, the above processing is explained more specifically, with reference to FIG. 11.

FIG. 11 is a diagram for explaining operations of the devices included the audio-video output system 1 in the present embodiment.

As shown in FIG. 11, when the video format of the video outputted by the DVD recorder 10 is changed from 1080 p to 480 p at a time T1, the video latency in the TV 30 changes from 100 ms to 30 ms, for example.

Since the video latency is changed to 30 ms from the previous amount of 100 ms, the TV 30 sends the AV amplifier 20, at a time T2, the CEC message instructing the AV amplifier 20 to change the video latency. This instruction is transmitted to the AV amplifier 20 using, for example, a command of a CEC message (Vendor Command), and includes information indicating the video latency measured by the TV 30.

Even when the video latency of the TV 30 changes due to the change of the video format from 1080 p to 480 p, the TV 30 does not change the video latency, 100 ms, in the EDID 303*a*. In other words, the TV 30 does not need to pulse the HPD signal 304*a*. Therefore, the DVD recorder 10 does not need to start the HDCP authentication to validate the AV amplifier 20, and thus can continue outputting the content (i.e., the audio and video data).

When the HDMI connection with the TV 30 is valid (namely, the HPD signal 304*a* is High), the AV amplifier 20 prioritizes the video latency obtained from the received CEC message. On account of this, regardless of the video latency described in the EDID 303*a* of the TV 30, the AV amplifier 20 can adjust the timing of the audio output.

As described thus far, according to the audio-video data synchronization method in the present embodiment, the video latency which is optimum for the system is obtained from the EDID when the HDMI connection is started, so that unnecessary command notifications transmitted using control messages can be reduced.

Also, according to the audio-video data synchronization method in the present embodiment, when the video latency is changed, the video latency is notified to the AV amplifier 20 using a command of a control message which does not cause the interruption to the HDMI connection. Thus, without interrupting the transmission of the content (i.e., the audio and video data) being reproduced by the DVD recorder 10, the AV amplifier 20 can adjust the timing of the audio output to the optimum timing to synchronize with the video output.

That is to say, according to the audio-video data synchronization method in the present embodiment, when the indication of the connection validity status information changes from Invalid to Valid, the audio output device can obtain the display identification data that includes the information indicating the video latency without transmission of the control message. On this account, an increase in the amount of control message transmission can be suppressed, and also the outputs of the audio and video can be synchronized with each other. Moreover, when the connection validity status information indicates Valid, the audio output device can obtain the video latency measured by the video output device through receiving the control message. Thus, a change of the connection status in order to obtain the display identification data is not required. In other words, when the connection validity status information indicates Valid, the connection validity status information does not need to be changed. Thus, the outputs of the audio and video data can be synchronized with each other, without causing unnecessary authentications and video output interruption.

According to the audio-video data synchronization method in the present embodiment, the EDID setting unit 302 sets the video latency corresponding to the video format of the highest quality supported by both the HDMI output device and the HDMI input device to the EDID 303a when, for example, the power is turned on. However, according to the audio-video data synchronization method in the present invention, it is not necessarily limited to the video latency corresponding to the video format of the highest quality.

For example, the EDID setting unit 302 may set a fixed value determined as product specifications of the HDMI input device, as the video latency. Also, when the HPD signal is changed from High to Low, the EDID setting unit 302 may update the video latency in the EDID 303a stored in the EDID memory unit 303 to the video latency measured by the video output unit 309. More specifically, the latest received video latency sent from the video latency setting unit 307a may be stored when the power is turned off, and then the EDID setting unit 302 may read the stored video latency when the power is turned on again. Here, suppose for example that the HDMI connection between the audio output device and the video output device becomes invalid and then becomes valid again. In such a case, immediately when the HDMI connection becomes valid, the audio output device can adjust the timing of the audio output to the optimum timing to synchronize with the video output in the case where the video format being used immediately before the HDMI connection became invalid continues to be used.

Figure 12:
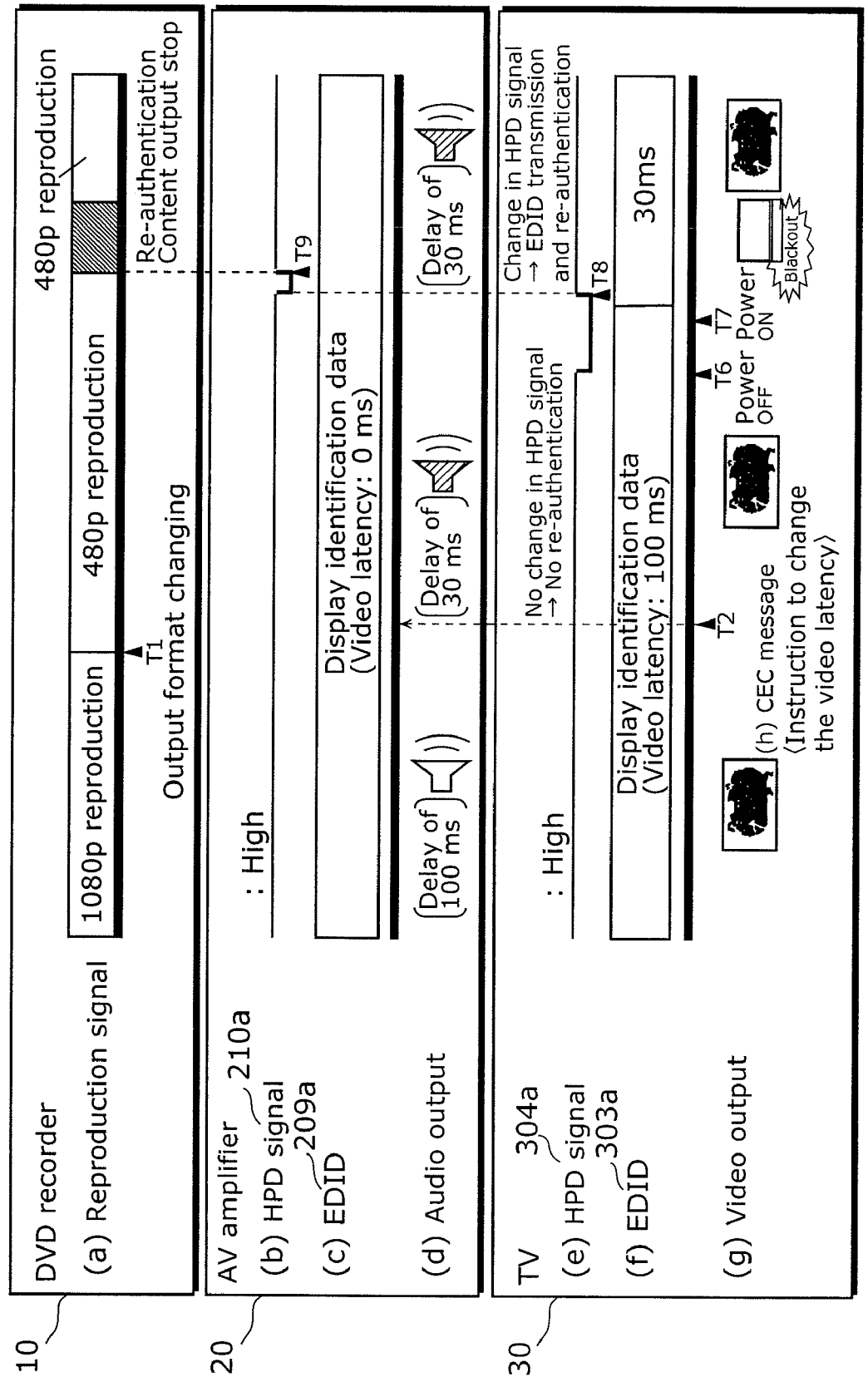
FIG. 12 is a diagram for explaining operations of devices included an audio-video output system according to a modification of the first embodiment of the present invention.

This operation is shown in FIG. 12. FIG. 12 is a diagram for explaining operations of the devices included the audio-video output system 1 according to a modification of the present embodiment. Note that FIG. 12 is obtained by adding operations performed from a time T6 onward, to FIG. 11. As shown in FIG. 12, when the TV 30 is turned off at the time T6, the HPD signal 304a of the TV 30 becomes Low. When the TV 30 is turned on again at a time T7, the video latency in the EDID 303a of the TV 30 changes to the video latency detected immediately before the TV 30 is turned off, that is, "30 ms". Then, the HPD signal of the TV 30 becomes High at a time T8, and the EDID 303a of the TV 30 is transmitted to the AV amplifier 20. As a result, the latency in the audio output from the AV amplifier 20 continues to be "30 ms". Then, the HPD signal 210a of the AV amplifier 20 becomes Low at the time T8 and then becomes High at a time T9, so that a re-authentication operation is started.

In the present embodiment, the video output unit 309 of the TV 30 measures the period of time taken for the input video data to be displayed on the output medium and notifies the video latency setting unit 307a of the measured period of time. However, note that the video output unit 309 does not necessarily need to measure the period of time. For example, by reference to a database previously holding the video latency corresponding to a format for the output video, an environmental setting condition, and the like, the TMDS decoding unit 308 may notify the video latency setting unit 307a of the video latency. In such a case, when outputting the video stream to the video output unit 309, the TMDS decoding unit 308 detects the video format and the like, and then obtains the video latency corresponding to the detected video format and the like.

Also, the video output device may be an audio-video output device that has an audio output function.

In the present embodiment, when the video latency is changed, the TV 30 voluntarily sends the AV amplifier 20 the CEC message specifying the video latency. However, note that the TV 30 may send the CEC message specifying the video latency, in response to a CEC query message sent from the AV amplifier 20. In other words, when the AV amplifier 20 sends the TV 30 the control message that requests the video latency, the TV 30 may send the AV amplifier 20 the video latency. With this, the audio-video output system can synchronize, at an arbitrary timing, the audio and video outputs according to the video latency that is easily measured.

Second Embodiment

Figure 13:
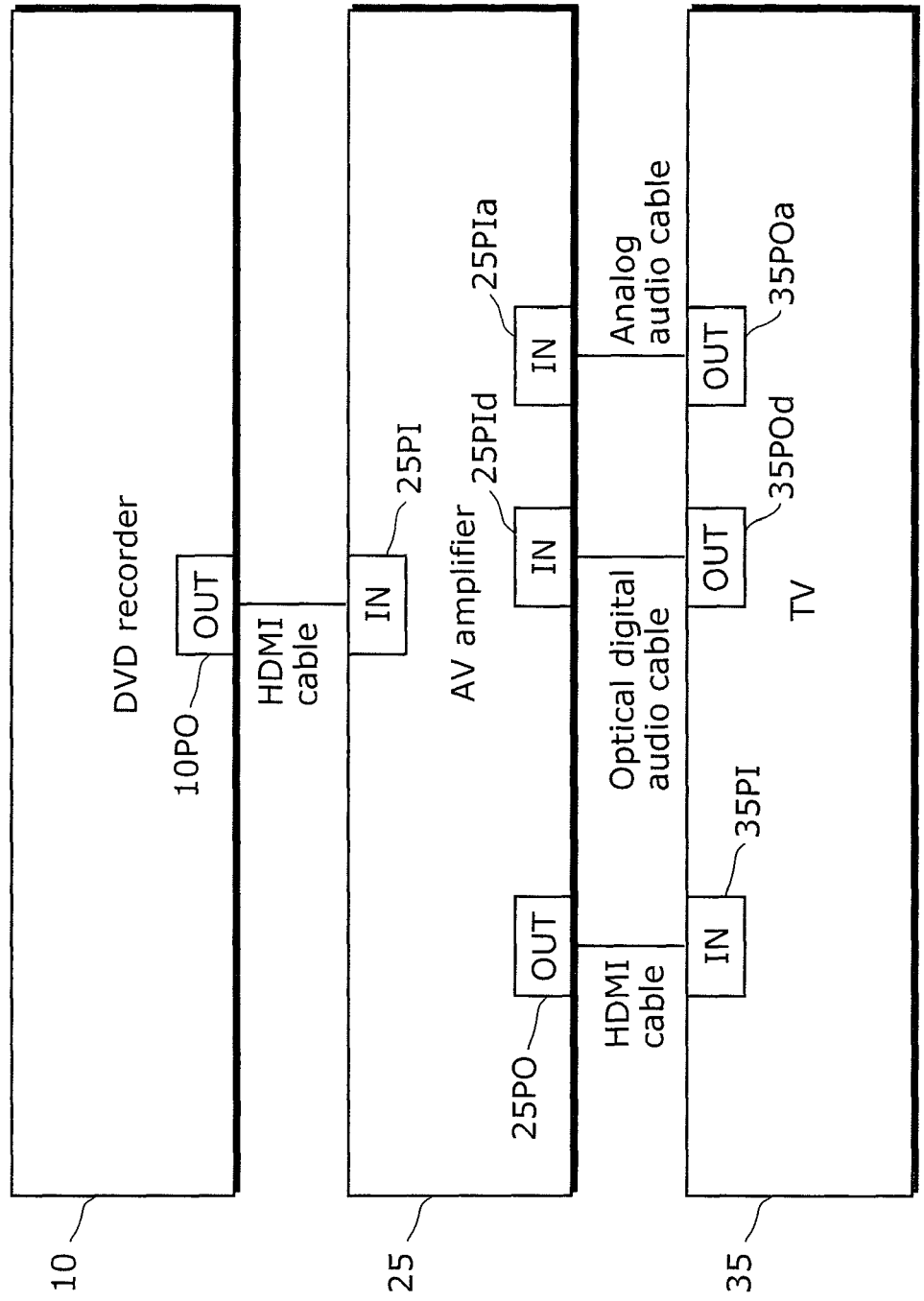
FIG. 13 is a diagram showing a configuration of an HDMI-connected audio-video output system according to a second embodiment of the present invention.

FIG. 13 is a diagram showing a configuration of an HDMI-connected audio-video output system 2 according to the second embodiment of the present invention. This audio-video output system 2 is configured by a DVD recorder 10, an AV amplifier 25, and a TV 35. The audio-video output system 2 in the present embodiment is different from the audio-video output system 1 in the first embodiment shown in FIG. 4 in that, for example, the AV amplifier 25 and the TV 35 are connected via a first audio cable (referred to as the "optical digital audio cable" hereafter) and a second audio cable (referred to as the "analog audio cable" hereafter) in addition to an HDMI cable. It should be noted that the DVD recorder 10 has the same functions as the DVD recorder 10 in the first embodiment shown in FIG. 4 and, therefore, the explanation thereof is omitted.

The AV amplifier 25 is an example of an audio output device for outputting audio, and includes an HDMI input port 25PI, an HDMI output port 25PO, an optical digital audio input port 25PId, and an analog audio input port 25PIa.

The TV 35 is an example of a video output device for outputting video, and includes an HDMI input port 35PI, an optical digital audio output port 35POd, and an analog audio output port 35POa.

The HDMI is capable of unidirectionally transmitting video data and first audio data (referred to as the "HDMI audio data" hereafter) reproduced by the DVD recorder 10, to the AV amplifier 25 and then to the TV 35 in this order. Also, the HDMI is capable of transmitting display identification data that indicates reproduction capability of the TV 35 and connection validity status information of the TV 35, unidirectionally from the TV 35 to the AV amplifier 25. Moreover, the HDMI is capable of transmitting control messages bidirectionally between the interconnected devices.

The optical digital audio cable is capable of unidirectionally transmitting second audio data (referred to as the "optical digital audio data" hereafter) from the optical digital audio output port 35POd of the TV 35 to the optical digital audio input port 25PId of the AV amplifier 25.

The analog audio cable is capable of unidirectionally transmitting third audio data (referred to as the "analog audio data" hereafter) from the analog audio output port 35POa of the TV 35 to the analog audio input port 25PIa of the AV amplifier 25.

In this audio-video output system 2, when a tuner included in the TV 35 outputs the audio and video using the received audio and video data, the optical digital audio data is transmitted from the TV 35 to the AV amplifier 25 via the optical digital audio cable and the analog audio data is transmitted from the TV 35 to the AV amplifier 25 via the analog audio cable.

Here, for example, when the AV amplifier 25 adjusts the timing of the audio output according to the video latency of the case where the video is outputted using the audio and video data transmitted via the HDMI, a latency caused due to a different transmission line of the audio data is not taken into account. For this reason, a synchronization error is caused between the audio output from the AV amplifier 25 and the video output from the TV 35.

It is the AV amplifier 25 that selects whether to output the audio using the optical digital audio data transmitted via the optical digital audio cable or using the analog audio data transmitted via the analog audio cable. On account of this, according to the audio-video data synchronization method in the first embodiment, the TV 35 cannot determine which audio data is selected by the AV amplifier 25. Thus, the synchronization error caused between the audio output from the AV amplifier 25 and the video output from the TV 35 cannot be solved.

To address this problem, according to the audio-video data synchronization method in the second embodiment of the present invention, the video latency reflecting the audio latency is calculated for each transmission line of the audio data, and a control message including all the calculated video latencies is sent from the video output device to the audio output device. Then, the audio output device adjusts the timing of the audio output according to the video latency corresponding to the audio switching setting. That is to say, the video output device does not need to detect the setting status of the audio input of the audio output device. Moreover, when the audio input is switched in the audio output device, the audio output device can adjust the timing of the audio output to synchronize with the video output from the video output device, without sending and receiving new control messages.

Next, configurations of the devices that implement the audio-video data synchronization method in the present embodiment are explained as follows, with reference to the drawings.

The functional configuration of the DVD recorder 10 in the present embodiment is the same as the configuration shown in FIG. 5 and, therefore, its diagrammatic representation and explanation are omitted.

Figure 14:
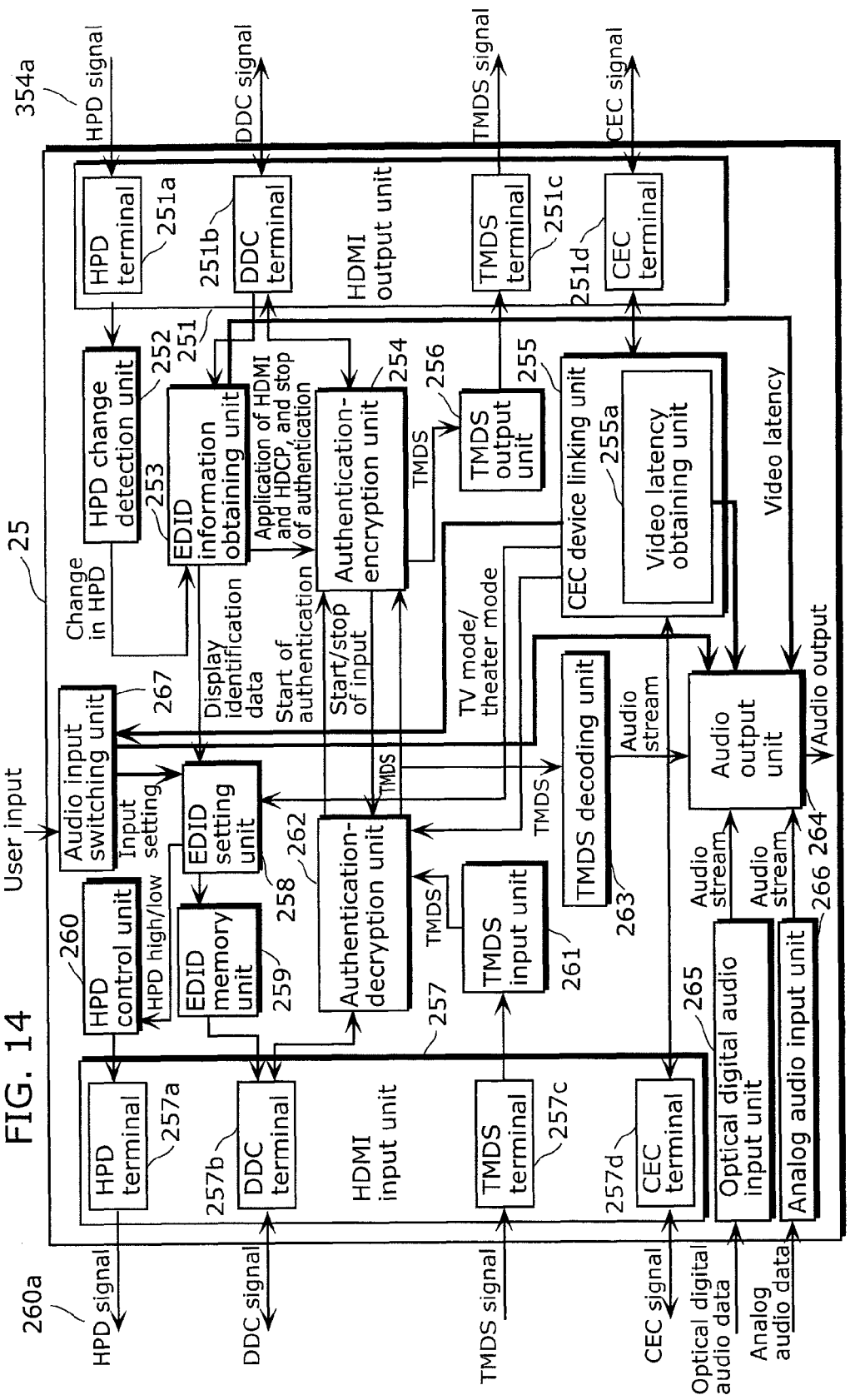
FIG. 14 is a block diagram showing a functional configuration of an AV amplifier according to the second embodiment of the present invention.

FIG. 14 is a block diagram showing a functional configuration of the AV amplifier 25 in the present embodiment.

As shown in FIG. 14, the AV amplifier 25 includes an HDMI output unit 251, an HPD change detection unit 252, an EDID information obtaining unit 253, an authentication-encryption unit 254, a CEC device linking unit 255, a TMDS output unit 256, an HDMI input unit 257, an EDID setting unit 258, an EDID memory unit 259, an HPD control unit 260, a TMDS input unit 261, an authentication-decryption unit 262, a TMDS decoding unit 263, an audio output unit 264, an optical digital audio input unit 265, an analog audio input unit 266, and an audio input switching unit 267.

The HDMI output unit 251 is configured by the HDMI output port 25PO, and sends audio and video data. Also, the HDMI output unit 251 sends and receives control messages (i.e., allows two-way communication). The HDMI output unit 251 has: an HPD terminal 251*a* which receives an HPD signal 354*a*; a DDC terminal 251*b* which communicates by DDC signals; a TMDS terminal 251*c* which sends a TMDS signal; and a CEC terminal 251*d* which communicates by CEC signals.

The HPD change detection unit 252 detects that the indication of the connection validity status information changes from Invalid to Valid or from Valid to Invalid. To be more specific, the HPD change detection unit 252 detects a change in the HPD signal 354*a* that is received via the HPD terminal 251*a* of the HDMI output unit 251. That is, the HPD change detection unit 252 detects a change in the HPD signal 354*a* from High to Low (a change from Valid to Invalid) or a change in the HPD signal 354*a* from Low to High (a change from Invalid to Valid).

When the HPD change detection unit 252 detects that the HPD signal 354*a* is changed from Low to High, the EDID information obtaining unit 253 communicates by DDC signals with the TV 35 via the DDC terminal 251*b* so as to obtain EDID 353*a* of the TV 35. The EDID 353*a* of the TV 35 describes the display identification data that includes information, such as audio and video data formats supportable by the TV 35 and the video latency of the TV 35. The EDID information obtaining unit 253 informs the display identification data to the EDID setting unit 258 and the audio output unit 264. The EDID 353*a* of the TV 35 also describes that the TV 35 is an HDMI device. On account of this, the EDID information obtaining unit 253 instructs the authentication-encryption unit 254 to apply HDCP for authenticating the TV 35. Here, note that the EDID information obtaining unit 253 gives the instruction only to apply HDCP, and thus does not give an instruction to start the authentication. When it is detected that the HPD signal 354*a* is changed from High to Low, the EDID information obtaining unit 253 instructs the authentication-encryption unit 254 to stop the authentication.

Following the instruction for the authentication start from the authentication-decryption unit 262, the authentication-encryption unit 254 validates the TV 35. To be more specific, the authentication-encryption unit 254 performs the authentication processing according to the HDCP authentication protocol by using the DDC signals with the TV 35 via the DDC terminal 251*b*. Since a TMDS output is necessary for the authentication, the authentication-encryption unit 254 first sends the data obtained by performing TMDS-encoding on content data that does not need copyright protection, to the TMDS output unit 256.

While the authentication with the TV 35 performed by the authentication-encryption unit 254 is succeeding, the authentication-encryption unit 254 instructs the authentication-decryption unit 262 to output the TMDS transmission data. Then, the authentication-encryption unit 254 encrypts the TMDS transmission data decrypted by the authentication-decryption unit 262 using the successful authentication information, so as to generate encrypted TMDS transmission data. After this, the authentication-encryption unit 254 sends the encrypted TMDS transmission data to the TMDS output unit 256.

On the other hand, when the authentication with the TV 35 performed by the authentication-encryption unit 254 fails, the AV amplifier 25 cannot output, to the TV 35, content data which needs copyright protection. For this reason, the authentication-encryption unit 254 instructs the authentication-decryption unit 262 to stop the output of the TMDS transmission data.

The CEC device linking unit 255 sends and receives CEC messages to and from the DVD recorder 10 and the TV 35 by using CEC signals via the CEC terminal 251*d* and the CEC terminal 257*d*. Moreover, the CEC device linking unit 255 detects a TV mode setting or a theater mode setting by sending and receiving the CEC messages to and from the TV 35. Then, the CEC device linking unit 255 notifies the EDID setting unit 258 and the authentication-decryption unit 262 of the information regarding the detected TV mode or theater mode setting as the setting information.

Moreover, the CEC device linking unit 255 has a video latency obtaining unit 255*a*. The video latency obtaining unit 255*a* receives, from the TV 35, a CEC message that includes information indicating the first, second, and third video latencies. The video latency obtaining unit 255*a* sends the first, second, and third video latencies obtained from the received CEC message to the audio output unit 264.

Furthermore, the CEC device linking unit 255 receives a CEC message that includes information regarding the audio switching instruction. When receiving this CEC message that includes information regarding the audio switching instruction, the CEC device linking unit 255 outputs the information obtained from the received CEC message to the audio input switching unit 267. For example, when receiving the CEC message that includes the audio switching instruction to output the audio using the audio and video data outputted from the DVD recorder 10, the CEC device linking unit 255 instructs the audio input switching unit 267 to cause the audio output unit 264 to switch to the audio output using the audio data obtained by the HDMI input unit 257. The input switching operation according to the CEC message is not a principal objective of the present invention, and therefore a detailed explanation thereof is omitted.

The TMDS output unit 256 outputs, to the TV 35, the encrypted TMDS transmission data obtained from the authentication-encryption unit 254 or the unencrypted TMDS transmission data, by sending the TMDS signal to the TV 35 via the TMDS terminal 251c. To be more specific, while the authentication with the TV 35 performed by the authentication-encryption 254 is succeeding, the TMDS output unit 256 sends the TMDS transmission data including the video data to the TV 35 via the HDMI output unit 251.

The HDMI input unit 257 is configured by the HDMI input port 25PI, and receives audio and video data. Also, the HDMI input unit 257 sends and receives control messages (i.e., allows two-way communication). The HDMI input unit 257 has: an HPD terminal 257a which sends an HPD signal 260a; a DDC terminal 257b which communicates by DDC signals; a TMDS terminal 257c which receives a TMDS signal; and a CEC terminal 257d which communicates by CEC signals.

When obtaining the display identification data from the EDID information obtaining unit 253, the EDID setting unit 258 determines a description of the EDID 259a based on the setting information (TV mode or theater mode) notified by the CEC device linking unit 255. Here, when the determined description is different from the existing description of the EDID 259a, the EDID setting unit 258 changes the description of the EDID 259a while the HPD signal 260a is Low. In the case where the HPD signal 260a is High when going to change the description of the EDID 259a, the EDID setting unit 258 instructs the HPD control unit 260 to change the HPD signal 260a to Low (HPD negate instruction). After changing the description of the EDID 259a, the EDID setting unit 258 instructs the HPD control unit 260 to change the HPD signal 260a to High (HPD assert instruction). Moreover, for example when receiving the audio switching instruction from the audio input switching unit 267 to output the audio using the audio data other than the data from the HDMI input unit 257, the EDID setting unit 258 instructs the HPD control unit 260 to change the HPD signal 260a, which is to be outputted to the DVD recorder 10 via the HPD terminal 257a, to Low. On the other hand, when receiving the audio switching instruction from the audio input switching unit 267 to output the audio using the audio data from the HDMI input unit 257, the EDID setting unit 258 determines a description of the EDID 259a and accordingly changes the EDID 259a based on the determined description as necessary. Then, the EDID setting unit 258 instructs the HPD control unit 260 to change the HPD signal 260a, which is to be outputted to the DVD recorder 10 via the HPD terminal 257a, to High.

The EDID memory unit 259 is configured by, for example, a nonvolatile memory, and stores the EDID 259a. This EDID 259a includes the display identification data.

Following the HPD assert instruction or the HPD negate instruction from the EDID setting unit 258, the HPD control unit 260 changes the HPD signal 260a, which is to be sent via the HPD terminal 257a, to High (Valid) or Low (Invalid).

The TMDS input unit 261 receives the encrypted TMDS transmission data sent from the DVD recorder 10, via the TMDS terminal 257c. Then, the TMDS input unit 261 outputs the encrypted TMDS transmission data to the authentication-decryption unit 262.

The authentication-decryption unit 262 responses to the authentication processing compliant with the authentication protocol that is performed on the AV amplifier 25 by the DVD recorder 10. When the DVD recorder 10 starts the authentication processing, the authentication-decryption 262 instructs the authentication-encryption unit 254 to start the authentication processing with the TV 35. Since a TMDS input is necessary for the authentication response, the authentication-decryption unit 262 obtains, from the TMDS input unit 261, the TMDS transmission data which does not need copyright protection and has not been encrypted. While the authentication with the AV amplifier 25 is succeeding, the authentication-decryption unit 262 obtains the encrypted TMDS transmission data from the TMDS input unit 261. The authentication-decryption unit 262 decrypts the obtained encrypted TMDS transmission data so as to generate (unencrypted) TMDS transmission data. Here, on the basis of the setting information (TV mode or theater mode) notified by the CEC device linking unit 255, the authentication-decryption unit 262 outputs the generated TMDS transmission data to, for example, the authentication-encryption unit 254. To be more specific, when the setting information indicates the theater mode, the authentication-decryption unit 262 outputs the decrypted TMDS transmission data to the authentication-encryption unit 254 and to the TMDS decoding unit 263. On the other hand, when the setting information indicates the TV mode, the authentication-decryption unit 262 outputs the decrypted TMDS transmission data to the authentication-encryption unit 254.

The TMDS decoding unit 263 performs TMDS decoding on the TMDS transmission data so as to generate an audio stream. Then, the TMDS decoding unit 263 outputs the generated audio stream to the audio output unit 264.

The optical digital audio input unit 265 is configured by the optical digital audio input port 25PId, and receives the optical digital audio data from the TV 35. The optical digital audio input unit 265 outputs the audio stream obtained from the received optical digital audio data, to the audio output unit 264.

The analog audio input unit 266 is configured by the analog audio input port 25PIa, and receives the analog audio data from the TV 35. The analog audio input unit 266 outputs the audio stream obtained from the received analog audio data, to the audio output unit 264.

Following the instruction from the user or from the CEC device linking unit 255, the audio input switching unit 267 generates an audio switching instruction. The audio switching instruction refers to information that orders an audio input switching. To be more specific, the audio switching instruction refers to information used for instructing the audio output unit 264 to determine whether to output the audio using the audio data obtained by the HDMI input unit 257, the optical digital audio input unit 265, or the analog audio input unit 266. In other words, the audio switching instruction in the present embodiment refers to information that specifies whether: the audio is to be outputted using the audio data transmitted via the HDMI; the audio is to be outputted using the optical digital audio data transmitted via the optical digital audio cable; or the audio is to be outputted using the analog audio data transmitted via the analog audio cable. Then, the audio input switching unit 267 notifies the audio output unit 264 and the EDID setting unit 258 of the generated audio switching instruction.

The audio output unit 264 is configured by a speaker or the like. Following the audio switching instruction notified by the audio input switching unit 267, the audio output unit 264 outputs the audio using the audio stream outputted by the TMDS decoding unit 263, the optical digital audio unit 265, or the analog audio input unit 266. Here, the audio output unit 264 selects the video latency corresponding to the audio switching instruction notified by the audio input switching unit 267, from among the video latencies obtained by the EDID information obtaining unit 253 or the video latency obtaining unit 255a. Then, the audio output unit 264 adjusts (delays) the timing of the audio output according to the selected video latency. For example, when the notified audio switching instruction specifies that the audio output unit 264 should output the audio using the optical digital audio data obtained by the optical digital audio input unit 265, the audio output unit 264 adjusts the timing of the audio output according to the second video latency that corresponds to the audio data obtained by the optical digital audio input unit 265.

Figure 15:
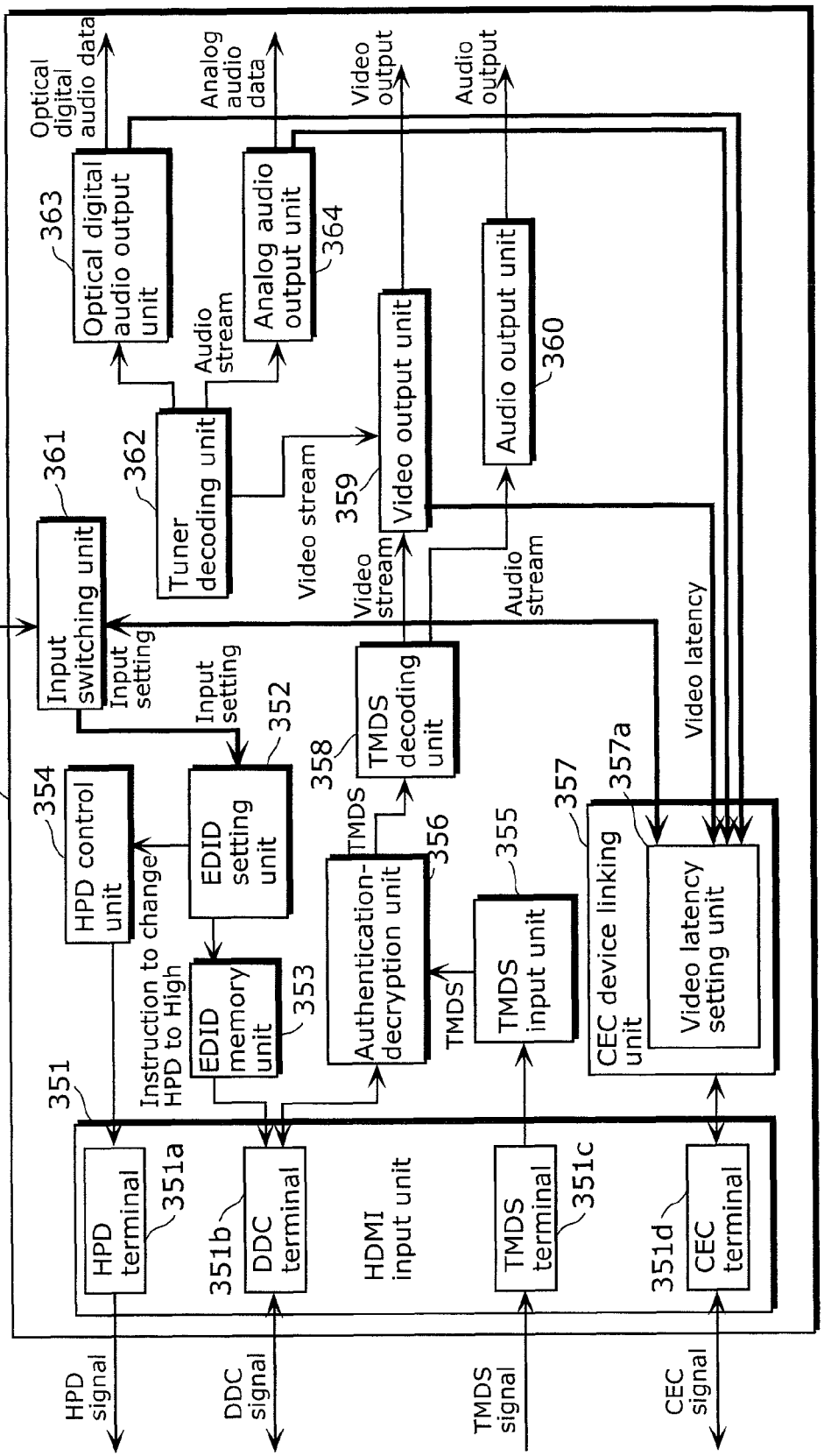
FIG. 15 is a block diagram showing a functional configuration of a TV according to the second embodiment of the present invention.

FIG. 15 is a block diagram showing a functional configuration of the TV 35 in the present embodiment.

As shown in FIG. 15, the TV 35 includes an HDMI input unit 351, an EDID setting unit 352, an EDID memory unit 353, an HPD control unit 354, a TMDS input unit 355, an authentication-decryption unit 356, a CEC device linking unit 357, a TMDS decoding unit 358, a video output unit 359, an audio output unit 360, an input switching unit 361, a tuner decoding unit 362, an optical digital audio output unit 363, and an analog audio output unit 364.

The HDMI input unit 351 is configured by the HDMI input port 35PI, and receives audio and video data. Also, the HDMI input unit 351 sends and receives control messages (i.e., allows two-way communication). The HDMI input unit 351 has: an HPD terminal 351a which sends an HPD signal 354a; a DDC terminal 351b which communicates by DDC signals; a TMDS terminal 351c which receives a TMDS signal; and a CEC terminal 351d which communicates by CEC signals.

The EDID setting unit 352 determines a description of the EDID 353a at power-on, for example, and sets the determined description to the EDID 353a. After setting the description of the EDID 353a, the EDID setting unit 352 instructs the HPD control unit 354 to change the HPD signal 354a to High (HPD assert instruction). Also, for example, when obtaining the video switching instruction to output the video using the video data other than the video data transmitted via the HDMI, the EDID setting unit 352 instructs the HPD control unit 354 to change the HPD signal 354a, which is to be outputted to the AV amplifier 25 via the HPD terminal 351a, to Low. On the other hand, for example, when obtaining the video switching instruction to output the video using the video data transmitted via the HDMI, the EDID setting unit 352 determines a description of the EDID 353a and accordingly changes the EDID 353a as necessary. Then, the EDID setting unit 352 instructs the HPD control unit 354 to change the HPD signal 354a, which is to be outputted via the HPD terminal 351a, to High.

The EDID memory unit 353 is configured by, for example, a nonvolatile memory, and stores the EDID 353a. The display identification data that includes information indicating the video latency is set to the EDID 353a.

Following the HPD assert instruction from the EDID setting unit 352, the HPD control unit 354 changes the HPD signal 354a, which is to be sent to the AV amplifier 25 via the HPD terminal 351a, to High (Valid). Also, following the HPD negate instruction from the EDID setting unit 352, the HPD control unit 354 changes the HPD signal 354a, which is to be sent to the AV amplifier 25 via the HPD terminal 351a, to Low (Invalid).

The TMDS input unit 355 receives the encrypted TMDS data sent from the AV amplifier 25, by receiving the TMDS signal from the TMDS terminal 351a. Then, the TMDS input unit 355 outputs the received encrypted TMDS transmission data to the authentication-decryption unit 356.

The authentication-decryption 356 responses to the authentication performed on the TV 35 by the AV amplifier 25. Since a TMDS input is necessary for the authentication response, the authentication-decryption unit 356 obtains, from the TMDS input unit 355, the TMDS transmission data which does not need copyright protection and has not been encrypted. While the authentication with the TV 35 is succeeding, the authentication-decryption unit 356 obtains the encrypted TMDS transmission data from the TMDS input unit 355. The authentication-decryption unit 356 decrypts the obtained encrypted TMDS transmission data so as to generate (unencrypted) TMDS transmission data. Then, the authentication-decryption unit 356 outputs the generated TMDS transmission data to the TMDS decoding unit 358.

The CEC device linking unit 357 sends and receives CEC messages to and from the AV amplifier 25 by using CEC signals via the CEC terminal 351d. Moreover, the CEC device linking unit 357 switches the setting between the TV mode and the theater mode by sending and receiving the CEC messages to and from the AV amplifier 25 and to and from the DVD recorder 10 via the AV amplifier 25, if necessary.

The CEC device linking unit 357 has a video latency setting unit 357a. The video latency setting unit 357a obtains the video latency from the video output unit 359. Moreover, the video latency setting unit 357a obtains the audio latency from the optical digital audio output unit 363 and the analog audio output unit 364. Here, when receiving, from the input switching unit 361, the video switching instruction to output the video using the video stream generated by the tuner decoding unit 362, the video latency setting unit 357a sends the AV amplifier 25 the CEC message including the first, second, and third video latencies. Here, the first video latency refers to the video latency obtained from the video output unit 359 (100 ms, for example). The second video latency refers to the video latency in the case where the audio is outputted from the optical digital audio output unit 363. For instance, the second video latency is represented by a difference value between the video latency obtained from the audio output unit 359 (100 ms, for example) and the audio latency obtained from the optical digital audio output unit 363 (60 ms, for example) (that is, 40 ms=100 ms−60 ms). The third video latency refers to the video latency in the case where the audio is outputted from the analog audio output unit 364. For instance, the third video latency is represented by a difference value between the video latency obtained from the audio output unit 359 (100 ms, for example) and the audio latency obtained from the analog audio output unit 364 (50 ms, for example) (that is, 50 ms=100 ms−50 ms). In other words, when the CEC device linking unit 357 sends the CEC message including the information indicating the first, second, and third video latencies, this means that the AV amplifier 25 can receive: the first video latency, 100 ms, for synchronizing the timing of the audio output based on the audio data transmitted via the HDMI with the video outputted from the TV 35; the second video latency, 40 ms, for synchronizing the timing of the audio output based on the audio data transmitted via the optical digital audio cable with the video outputted from the TV 35; and the third video latency, 50 ms, for synchronizing the timing of the audio output based on the audio data transmitted via the analog audio cable with the video outputted from the TV 35.

The TMDS decoding unit 358 performs TMDS decoding on the TMDS transmission data so as to generate audio and video streams. Then, the TMDS decoding unit 358 outputs the generated video stream to the video output unit 359. Also, the TMDS decoding unit 358 outputs the generated audio stream to the audio output unit 360.

The tuner decoding unit 362 decodes the audio and video data sent from a tuner that is not shown, so as to generate the audio and video streams. Then, the tuner decoding unit 362 outputs the generated video stream to the video output unit 359. Also, the tuner decoding unit 362 outputs the generated audio stream to the optical digital audio output unit 363 and the analog audio output unit 364.

The video output unit 359 outputs the video to an output medium, such as a display. Here, the video output unit 359 detects a period of time taken from when the TV 35 receives the encrypted TMDS transmission data to when the video is displayed on the output medium. Then, the video output device 359 notifies the video latency setting unit 357*a* of the detected period of time as the video latency.

The audio output unit 360 is configured by a speaker or the like, and outputs audio using the audio stream generated by the TMDS decoding unit 358.

The optical digital audio output unit 363 is configured by the optical digital audio output port 35POd, and sends the AV amplifier 25 the audio stream generated by the tuner decoding unit 362 as the audio data. Moreover, the optical digital audio output unit 363 measures a period of time taken for the obtained audio stream to be received by the AV amplifier 25. Then, when detecting a change in the measure period of time, the optical digital audio output unit 363 may notify the video latency setting unit 357*a* of the measured period of time as the audio latency.

The analog audio output unit 364 is configured by the analog audio output port 35POa, and sends the AV amplifier 25 the audio stream generated by the tuner decoding unit 362 as the audio data. Moreover, the analog audio output unit 364 measures a period of time taken for the obtained audio stream to be received by the AV amplifier 25. Then, when detecting a change in the measure period of time, the analog audio output unit 364 may notify the video latency setting unit 357*a* of the measured period of time as the audio latency.

Following the instruction from the user or from the CEC device linking unit 357, the input switching unit 361 generates a video switching instruction. Here, the video switching instruction refers to information that orders a video input switching. To be more specific, the video switching instruction refers to information used for instructing the video output unit 359 to determine whether to output the video using the video stream generated by the TMDS decoding unit 358 or the tuner decoding unit 362. In other words, the video switching instruction in the present embodiment refers to information that specifies whether: the video is to be outputted using the video data transmitted via the HDMI; or the video is to be outputted using the video data obtained by the tuner. Then, the input switching unit 361 notifies the EDID setting unit 352 and the video latency setting unit 357*a* of the generated video switching instruction.

Next, the audio-video data synchronization method implemented by the audio-video output system 2 configured as described above is explained, with reference to FIG. 16.

Figure 16:
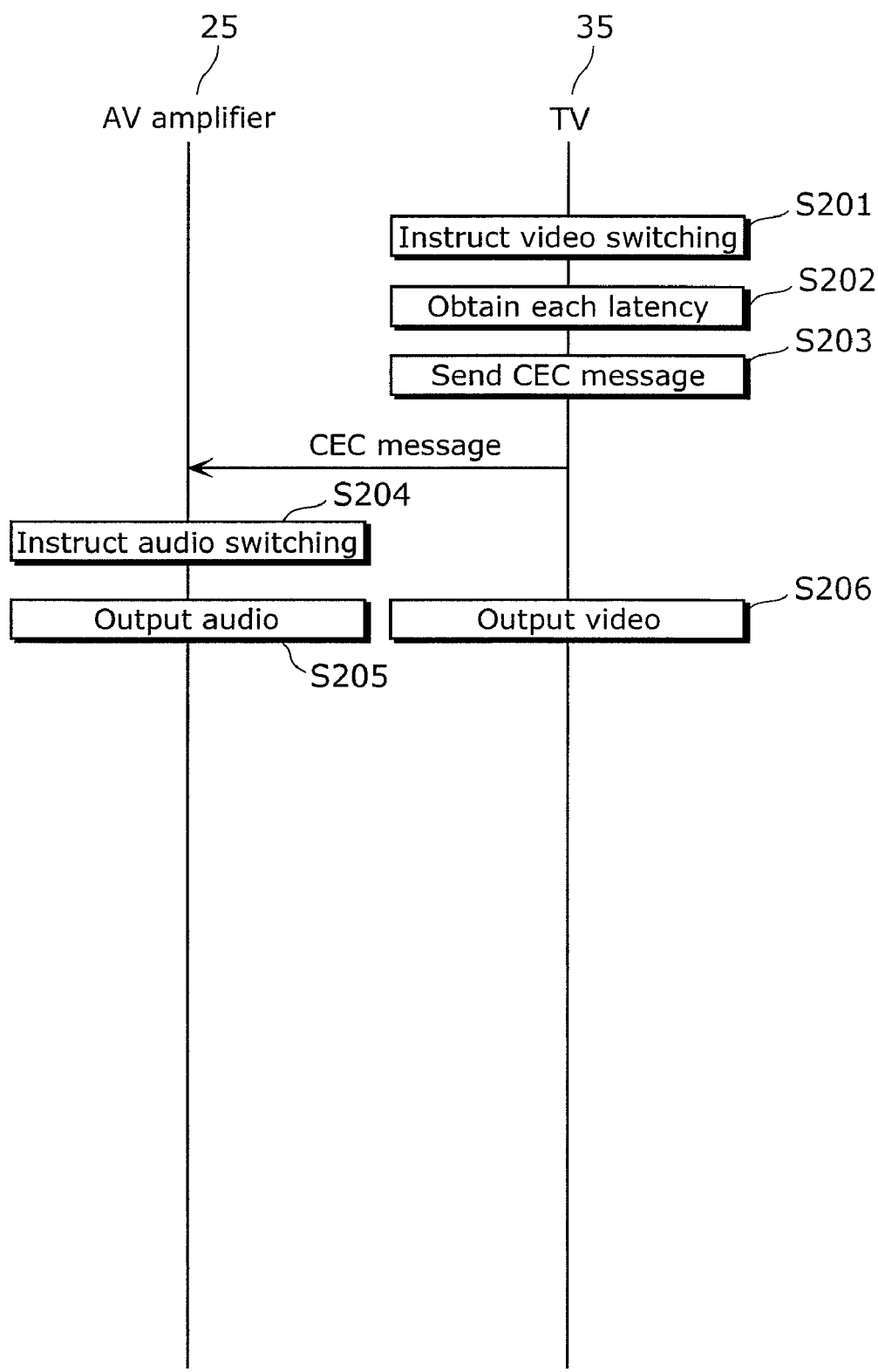
FIG. 16 is a diagram showing a flow of processing performed by the devices included in the audio-video output system according to the second embodiment of the present invention.

FIG. 16 is a diagram showing a flow of processing performed by the devices included in the audio-video output system 2 in the present embodiment. It should be noted that since the processing performed here in the present embodiment is the same as the processing performed by the audio-video output system 1 in the first embodiment explained with reference to FIGS. 8 to 10, FIG. 16 shows only the processing different from the ones shown in FIGS. 8 to 10.

Firstly, the input switching unit 361 of the TV 35 notifies the video latency setting unit 357*a* of the video switching instruction to output the video using the video stream generated by the tuner decoding unit 362 (step S201).

Next, the video latency setting unit 357*a* of the TV 35 obtains all the latencies (step S202). To be more specific, the video latency setting unit 357*a* obtains the video latency which is a period of time taken for the TV 35 to output the video using the video data. Moreover, the video latency setting unit 357*a* obtains, from the optical digital audio output unit 363, the optical-digital audio latency which is a period of time taken for the TV 35 to generate the optical digital data transmitted via the optical digital audio cable. Furthermore, the video latency setting unit 357*a* obtains, from the analog audio output unit 364, the analog audio latency which is a period of time taken for the TV 35 to generate the analog audio data transmitted via the analog audio cable.

Then, the video latency setting unit 357*a* of the TV 35 sends the AV amplifier 25 the CEC message that includes the information indicating the first, second, and third video latencies obtained from the obtained video latency, optical digital audio latency, and analog audio latency, respectively (step S203). To be more specific, the first video latency is the video latency obtained from the video output unit 359. The second video latency is represented by the value calculated by subtracting the optical digital audio latency from the video latency obtained from the video output unit 359. The third video latency is represented by the value calculated by subtracting the analog audio latency from the video latency obtained from the video output unit 359.

Next, the audio input switching unit 267 of the AV amplifier 25 notifies the audio output unit 264 of the audio switching instruction (step S204). To be more specific, the audio input switching unit 267 notifies the audio output unit 264 of: the audio switching instruction to output the audio using the audio data transmitted via the HDMI; the audio switching instruction to output the audio using the audio data transmitted via the optical digital audio cable; or the audio switching instruction to output the audio using the audio data transmitted via the analog audio cable.

Then, the audio output unit 264 of the AV amplifier 25 adjusts the output timing and accordingly outputs the audio based on the first, second, or third video latency transmitted in step S203 that corresponds to the audio switching instruction notified by the audio input switching unit 267 (step S205). To be more specific, when receiving the audio switching instruction to output the audio using the audio data transmitted via the HDMI, the audio output unit 264 adjusts the output timing and accordingly outputs the audio based on the first video latency. When receiving the audio switching instruction to output the audio using the audio data transmitted via the optical digital audio cable, the audio output unit 264 adjusts the output timing and accordingly outputs the audio based on the second video latency. When receiving the audio switching instruction to output the audio using the audio data transmitted via the analog audio cable, the audio output unit 264 adjusts the output timing and accordingly outputs the audio based on the third video latency.

Following the video switching instruction provided in step S201, the video output unit 359 of the TV 35 outputs the video (step S206). To be more specific, the video output unit 359 outputs the video using the video stream generated by the tuner decoding unit 362.

Next, the above processing is explained more specifically, with reference to FIG. 17.

FIG. 17 is a diagram for explaining operations of the devices included the audio-video output system 2 in the present embodiment.

As shown in FIG. 17, suppose that the video switching instruction, whereby the input is switched from the video data obtained from the DVD recorder to the video data obtained from the TV tuner, occurs in the TV 35 at a time T3. In the case of the theater mode, the audio data is transmitted from the TV 35 to the AV amplifier 25 via the optical digital audio cable (the optical digital audio output port 35POd→the optical digital audio input port 25PId) or via the analog audio cable (the analog audio output port 35POa→the analog audio input port 25PIa). Here, note that the video latency which is a period of time taken for the TV 35 to show the video data on the display is "100 ms", which is the same as in the case where the video is outputted using the video data in the 1080 p format that is received from the DVD recorder 10.

After the occurrence of the video switching instruction, the TV 35 sends the AV amplifier 25 the CEC message that includes the information indicating the first, second, and third video latencies, at a time T4. This instruction is transmitted using, for example, a command of a CEC message (Vendor Command).

Here, in the case where a period of time taken for the TV 35 to generate and transmit the optical digital audio data transmitted via the optical digital audio cable is "60 ms", the second video latency used by the AV amplifier 25 to output the audio using the optical digital audio data transmitted via the optical digital audio cable is "40 ms (=100 ms−60 ms)". On the other hand, in the case where a period of time taken for the TV 35 to generate and transmit the analog audio data transmitted via the analog audio cable is "50 ms", the third video latency used by the AV amplifier 25 to output the audio using the analog audio data transmitted via the analog audio cable is "50 ms (=100 ms−50 ms)".

In this way, the first, second, and third video latencies are sent to the AV amplifier 25. On account of this, even when the audio switching instruction, which instructs to switch from optical digital audio to analog audio or from analog audio to optical digital audio, occurs in the AV amplifier 25 after the time T4, the AV amplifier 25 can output the audio in synchronization with the video outputted from the TV 35. That is to say, regardless of the video latency described in the EDID 353a and without receiving the CEC message whenever the audio switching instruction has occurred in the AV amplifier 25 itself, the AV amplifier 25 can output the audio in synchronization with the video outputted from the TV 35.

Also, the TV 35 does not need to change the video latency described in the EDID 353a and thus does not need to detect the audio switching instruction occurring in the AV amplifier 25. That is to say, since only the AV amplifier 25 has to detect the audio switching instruction occurring in the AV amplifier 25 itself, a change in the lip-sync error can be easily corrected.

As described thus far, according to the audio-video data synchronization method in the present embodiment, the AV amplifier 25 can previously obtain the video latencies corresponding to the individual transmission lines that transmit the audio data. Thus, without receiving the control message whenever the audio switching, from optical digital audio to analog audio or from analog audio to optical digital audio, has occurred in the AV amplifier 25, the AV amplifier 25 can change the video latency to the optimum video latency used for synchronizing the audio and video outputs.

Also, the TV 35 does not need to detect the audio switching occurring in the AV amplifier 25 and therefore a change in the lip-sync error can be easily corrected.

More specifically, according to the audio-video data synchronization method in the present embodiment, the video latencies corresponding to the transmission lines are sent to the audio output device. On account of this, even when the audio output device switches the audio output, the outputs of audio and video can be immediately synchronized with each other. Moreover, the audio output device does not need to send the control message whenever switching the audio output, thereby suppressing an increase in the amount of control message transmission.

The present embodiment describes a case where, when the input switching unit 361 of the TV 35 sends the video switching instruction to output the video using the video data other than the video data transmitted via the HDMI, the video latency setting unit 357a sends the CEC message including the video latency. However, note that the timing of sending the CEC message is not limited to this.

Moreover, the present embodiment describes a case where the TV 35 voluntarily sends the AV amplifier 25 the CEC message including the video latency. However, note that the TV may send the CEC message that includes the information indicating the video latency, in response to a CEC query message sent from the AV amplifier 25.

Furthermore, the present embodiment describes a case where the video latency is described in the EDID 353a of the TV 35 and then the audio output unit 264 of the AV amplifier 25 obtains the video latency from the EDID information obtaining unit 253. However, note that the present invention is not limited to this. For example, in the case of the audio-video data synchronization method according to the present invention, the video latency compliant with the HDMI Standard Version 1.3a does not need to be described in the EDID 353a.

Although the audio-video data synchronization method according to the present invention has been thus explained on the basis of the embodiments, the present invention is not limited to these embodiments. Various modifications made to the present embodiments that can be conceived by those skilled in the art and forms configured by combining constituent elements in different embodiments without departing from the teachings of the present invention are included in the scope of the present invention.

For example, the above embodiments describe a case where the devices included in the audio-video output system are interconnected via the HDMI. However, the present invention is not necessarily limited to such an embodiment. For instance, the devices included in the audio-video output system may be interconnected via an interface which is compliant with a different communication system and capable of providing functions equivalent to those of the HDMI, whether wire communication or wireless communication.

Moreover, the present invention can be implemented not only as the audio-video data synchronization method described above, but also as a program causing a computer to execute the steps included in the audio-video data synchronization method. It should be obvious that such a program can be distributed via a recording medium such as a CD-ROM or a transmission medium such as the Internet.

INDUSTRIAL APPLICABILITY

The present invention can be applied to an audio-video data synchronization method in the case where video is outputted by a video output device such as a TV and audio is outputted by an audio output device such as an AV amplifier. In particular, the present invention can be applied to a method of synchronizing outputs of audio and video data between a plurality of devices connected to a network such as a home entertainment network that enables bidirectional sending and receiving of messages between the plurality of devices.

The invention claimed is:

1. An audio-video data synchronization method of synchronizing audio outputted from an audio output device and video outputted from a video output device in an audio-video output system including the audio output device and the video output device which are interconnected via a predetermined interface,
    wherein the interface is capable of: unidirectionally transmitting video data from the audio output device to the video output device; unidirectionally transmitting, from the video output device to the audio output device, display identification data that indicates a reproduction capability of the video output device and connection validity status information that indicates validity status of a connection of the video output device; and bidirectionally transmitting a control message,
    said audio-video data synchronization method comprising:
    authenticating with the video output device when the indication of the connection validity status information changes from Invalid to Valid;
    sending the video data from the audio output device to the video output device via the interface while the connection validity status information indicates Valid, while the authentication performed in said authenticating is succeeding;
    outputting the video from the video output device, using the video data sent in said sending;
    obtaining, by the audio output device, a first latency that is a period of time taken for the video output device to output the video, by receiving the display identification data that includes information indicating the first latency from the video output device via the interface when the indication of the connection validity status information changes from Invalid to Valid;
    adjusting, by the audio output device, timing of outputting the audio according to the first latency obtained in said obtaining of a first latency;
    obtaining, by the video output device, a second latency which is a period of time taken to output the video in said outputting;
    notifying the audio output device of the second latency by sending a control message from the video output device via the interface when the connection validity status information indicates Valid, the control message including information that indicates the second latency obtained in said obtaining of a second latency; and
    adjusting, by the audio output device, timing of outputting the audio according to the second latency notified in said notifying.

2. The audio-video data synchronization method according to claim 1,
    wherein the video output device includes a memory which is rewritable when the connection validity status information indicates Invalid and which stores the first latency,
    the display identification data that includes the information indicating the first latency stored in the memory is obtained in said obtaining of a first latency, and
    the first latency stored in the memory is not updated in said notifying.

3. The audio-video data synchronization method according to claim 2, further comprising
    writing the second latency obtained in said obtaining of a second latency as the first latency into the memory, when the indication of the connection validity status information changes from Valid to Invalid.

4. The audio-video data synchronization method according to claim 1,
    wherein the first latency is a predetermined period depending on the video output device.

5. The audio-video data synchronization method according to claim 1,
    wherein the second latency obtained in said obtaining of a second latency is notified as the first latency in said notifying, when the indication of the connection validity status information changes from Valid to Invalid.

6. The audio-video data synchronization method according to claim 1,
    wherein the second latency obtained in said obtaining of a second latency is notified in said notifying when a difference value between: the first latency obtained in said obtaining of a first latency or a second latency having been previously notified in said notifying; and the second latency obtained in said obtaining of a second latency, exceeds a predetermined threshold value.

7. The audio-video data synchronization method according to claim 1, further comprising
    requesting a transmission of the second latency by sending a control message that includes information of the transmission request from the audio output device to the video output device,
    wherein the second latency is notified in said notifying when the control message is sent in said requesting.

8. An audio-video data synchronization method of synchronizing audio outputted from an audio output device and video outputted from a video output device in an audio-video output system including the audio output device and the video output device which are interconnected via a predetermined interface, a first audio cable, and a second audio cable,
    wherein the interface is capable of: unidirectionally transmitting video data and first audio data from the audio output device to the video output device; and bidirectionally transmitting a control message,
    the first audio cable is capable of transmitting second audio data from the video output device to the audio output device, and
    the second audio cable is capable of transmitting third audio data from the video output device to the audio output device,
    said audio-video data synchronization method comprising:
    sending, from the video output device to the audio output device: a first latency which is a period of time taken for the video output device to output the video; a second latency which is a period of time taken to output the video when the audio output device outputs the second audio data transmitted via the first audio cable; and a third latency which is a period of time taken to output the video when the audio output device outputs the third audio data transmitted via the second audio cable;
    specifying an audio switching to output the audio using one of the first audio data transmitted via the interface, the second audio data transmitted via the first audio cable, and the third audio data transmitted via the second audio cable; and
    adjusting timing of outputting the audio according to the first latency sent in said sending when the audio output using the first audio data is specified in said specifying, adjusting timing of outputting the audio according to the second latency sent in said sending when the audio output using the second audio data is specified in said specifying, and adjusting timing of outputting the audio according to the third latency sent in said sending when the audio output using the third audio data is specified in said specifying, each said adjusting being performed by the audio output device.

9. A video output device which is connected to an audio output device via a predetermined interface, wherein the interface is capable of: unidirectionally transmitting video data from the audio output device to said video output device; unidirectionally transmitting, from said video output device to the audio output device, display identification data that indicates a reproduction capability of said video output device and connection validity status information that indicates validity status of a connection of said video output device; and bidirectionally transmitting a control message, said video output device comprising:

a video data receiving unit configured to receive the video data from the audio output device via the interface;

a video output unit configured to output video using the video data received by the video data receiving unit;

a first latency sending unit configured to send the display identification data which includes information indicating a first latency that is a period of time taken for said video output unit to output the video, to the audio output device via the interface when the indication of the connection validity status information changes from Invalid to Valid; and a second latency sending unit configured to send a control message which includes information indicating a second latency that is a period of time taken for said video output unit to output the video, to the audio output device via the interface when the connection validity status information indicates Valid.

10. An audio output device which is connected to a video output device via a predetermined interface, wherein the interface is capable of: unidirectionally transmitting video data from said audio output device to the video output device; unidirectionally transmitting, from the video output device to said audio output device, display identification data that indicates a reproduction capability of the video output device and connection validity status information that indicates validity status of a connection of the video output device; and bidirectionally transmitting a control message, said audio output device comprising:

an authentication unit configured to authenticate with the video output device, when the indication of the connection validity status information changes from Invalid to Valid;

a video data sending unit configured to send the video data to the video output device via the interface while the connection validity status information indicates Valid, while the authentication performed by said authentication unit is succeeding;

a first latency receiving unit configured to receive the display identification data which includes information indicating a first latency that is a period of time taken for the video output device to output the video, from the video output device via the interface when the indication of the connection validity status information changes from Invalid to Valid;

a second latency receiving unit configured to receive a control message which includes information indicating a second latency that is a period of time taken for the video output device to output the video, from the video output device via the interface when the connection validity status information indicates Valid; and an audio output unit configured to adjust timing of outputting audio according to one of the first latency received by said first latency receiving unit and the second latency received by said second latency receiving unit.

11. An audio-video output system comprising an audio output device and a video output device which are interconnected via a predetermined interface, wherein the interface is capable of: unidirectionally transmitting video data from the audio output device to said video output device; unidirectionally transmitting, from said video output device to the audio output device, display identification data that indicates a reproduction capability of said video output device and connection validity status information that indicates validity status of a connection of said video output device; and bidirectionally transmitting a control message, said video output device comprising:

a video data receiving unit configured to receive the video data from the audio output device via the interface;

a video output unit configured to output video using the video data received by the video data receiving unit;

a first latency sending unit configured to send the display identification data which includes information indicating a first latency that is a period of time taken for said video output unit to output the video, to the audio output device via the interface when the indication of the connection validity status information changes from Invalid to Valid; and a second latency sending unit configured to send a control message which includes information indicating a second latency that is a period of time taken to output the video, to the audio output device via the interface when the connection validity status information indicates Valid, said audio output device comprising:

an authentication unit configured to authenticate with the video output device, when the indication of the connection validity status information changes from Invalid to Valid;

a video data sending unit configured to send the video data to the video output device via the interface while the connection validity status information indicates Valid, while the authentication performed by said authentication unit is succeeding;

a first latency receiving unit configured to receive the display identification data which includes information indicating a first latency, from the video output device via the interface when the indication of the connection validity status information changes from Invalid to Valid;

a second latency receiving unit configured to receive a control message which includes information indicating a second latency, from the video output device via the interface when the connection validity status information indicates Valid; and an audio output unit configured to adjust timing of outputting audio according to one of the first latency received by said first latency receiving unit and the second latency received by said second latency receiving unit.

* * * * *